United States Patent
Tyagi et al.

(10) Patent No.: US 12,482,475 B2
(45) Date of Patent: Nov. 25, 2025

(54) ENCODING AND DECODING IVAS BITSTREAMS

(71) Applicant: DOLBY LABORATORIES LICENSING CORPORATION, San Francisco, CA (US)

(72) Inventors: Rishabh Tyagi, Sydney (AU); Juan Felix Torres, Sydney (AU)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 0 days.

(21) Appl. No.: 17/631,613

(22) PCT Filed: Jul. 30, 2020

(86) PCT No.: PCT/US2020/044342
§ 371 (c)(1),
(2) Date: Jan. 31, 2022

(87) PCT Pub. No.: WO2021/022087
PCT Pub. Date: Feb. 4, 2021

(65) Prior Publication Data
US 2022/0284910 A1 Sep. 8, 2022

Related U.S. Application Data

(60) Provisional application No. 63/057,666, filed on Jul. 28, 2020, provisional application No. 63/037,721, (Continued)

(51) Int. Cl.
*G10L 19/032* (2013.01)
*G10L 19/16* (2013.01)
(Continued)

(52) U.S. Cl.
CPC ........ *G10L 19/032* (2013.01); *G10L 19/167* (2013.01); *H04L 65/65* (2022.05); *H04L 65/75* (2022.05)

(58) Field of Classification Search
CPC ... G10L 19/032; G10L 19/167; G10L 19/008; H04L 65/65; H04L 65/75
See application file for complete search history.

(56) References Cited

U.S. PATENT DOCUMENTS 6,167,192 A 12/2000 Heo
8,428,941 B2 4/2013 Boehm
(Continued)

FOREIGN PATENT DOCUMENTS

GB 2592896 A 9/2021
TW I474316 B 2/2015
(Continued)

OTHER PUBLICATIONS

3GPPTDOC S4-180835, "Dolby VR Stream Audio Profile Candidate—Description of Bitstream, Decoder, and Renderer plus informative Encoder Description Agreement", t 3GPP TSG-SA4#99 meeting (Jul. 9-13, 2018), publicly accessible via https://www.3gpp.org/ftp/tsg_sa/WG4_CODEC/TSGS4_99/Docs/S4-180 (Year: 2018).*
(Continued)

*Primary Examiner* — Omar F Fernandez Rivas
*Assistant Examiner* — Michael C. Lee

(57) ABSTRACT

Encoding/decoding an immersive voice and audio services (IVAS) bitstream comprises: encoding/decoding a coding mode indicator in a common header (CH) section of an IVAS bitstream, encoding/decoding a mode header or tool header in the tool header (TH) section of the bitstream, the TH section following the CH section, encoding/decoding a metadata payload in a metadata payload (MDP) section of the bitstream, the MDP section following the CH section,
(Continued)

encoding/decoding an enhanced voice services (EVS) payload in an EVS payload (EP) section of the bitstream, the EP section following the CH section, and on the encoder side, storing or streaming the encoded bitstream, and on the decoder side, controlling an audio decoder based on the coding mode, the tool header, the EVS payload, and the metadata payload or storing a representation of same.

3 Claims, 7 Drawing Sheets

Related U.S. Application Data filed on Jun. 11, 2020, provisional application No. 62/927,894, filed on Oct. 30, 2019, provisional application No. 62/881,541, filed on Aug. 1, 2019.

(51) Int. Cl.
*H04L 65/65* (2022.01)
*H04L 65/75* (2022.01)

(56) References Cited

U.S. PATENT DOCUMENTS

| | | | |
|---|---|---|---|
| 9,826,328 B2 | 11/2017 | Mehta | |
| 9,955,278 B2 | 4/2018 | Fersch | |
| 10,026,413 B2 | 7/2018 | Laaksonen | |
| 10,304,467 B2 | 5/2019 | Tsukagoshi | |
| 2005/0111493 A1* | 5/2005 | Han | G11B 27/3027 370/509 |
| 2008/0228476 A1* | 9/2008 | Mehrotra | G10L 19/032 704/E19.015 |
| 2009/0210234 A1* | 8/2009 | Sung | G10L 19/00 704/500 |
| 2013/0173261 A1* | 7/2013 | Huang | G10L 19/167 704/222 |
| 2014/0082192 A1* | 3/2014 | Wei | H04L 65/752 709/224 |
| 2015/0332677 A1 | 11/2015 | Vasilache | |
| 2017/0125029 A1 | 5/2017 | Atti | |
| 2017/0263259 A1 | 9/2017 | Tsukagoshi | |
| 2018/0005640 A1 | 1/2018 | Tsukagoshi | |
| 2018/0233154 A1* | 8/2018 | Vaillancourt | G10L 19/24 |
| 2019/0103118 A1* | 4/2019 | Atti | G10L 19/008 |
| 2019/0172473 A1 | 6/2019 | Helmrich | |
| 2020/0112809 A1 | 4/2020 | Eronen | |
| 2020/0251123 A1* | 8/2020 | Fuchs | G10L 21/0232 |
| 2020/0321013 A1 | 10/2020 | Laaksonen | |
| 2021/0274305 A1* | 9/2021 | Eronen | H04W 4/023 |

FOREIGN PATENT DOCUMENTS

| | | |
|---|---|---|
| TW | 201643864 A | 12/2016 |
| WO | 2017132594 A2 | 8/2017 |
| WO | 2019068638 A1 | 4/2019 |
| WO | 2019081089 A1 | 5/2019 |
| WO | 2019097018 A1 | 5/2019 |
| WO | 2019105575 A1 | 6/2019 |
| WO | 2019143843 A1 | 7/2019 |
| WO | 2019143867 A1 | 7/2019 |
| WO | 2020012275 A1 | 1/2020 |
| WO | 2020074770 A1 | 4/2020 |
| WO | 2020102153 A1 | 5/2020 |
| WO | 2020102156 A1 | 5/2020 |
| WO | 2020104726 A1 | 5/2020 |
| WO | 2020115309 A1 | 6/2020 |

OTHER PUBLICATIONS

Directory Listing for https://www.3gpp.org/ftp/tsg_sa/WG4_CODEC/TSGS4_99/Docs/S4-180, showing that S4-180835 was available as of Jul. 8, 2018 (Year: 2018).*

3GPP TDOC S4-180835, "Dolby VR Stream Audio Profile Candidate—Description of Bitstream, Decoder, and Renderer plus informative Encoder Description Agreement", presented at 3GPP TSG-SA4#99 meeting (Jul. 9-13, 2018) (Year: 2018).*

Dolby Laboratories Inc: "IVAS design constraints from an end-to-end perspective", 3GPP Draft; S4-181099—IVAS Design Constraints From an End-To-End Perspective, Clean, 3rd Generation Partnership Project (3GPP), Mobile Competence Centre ; 650, Route Des Lucioles ; F-06921 Sophia-Ant • vol. SA WG4, No. Kechi, India; Oct. 15, 2018-Oct. 19, 2018 , Oct. 9, 2018 (Oct. 9, 2018).

Gabin, F. et al."5G Multimedia Standardization" Journal of ICT, vol. 6, 117-136, Mar. 2018.

Herre Jurgen et al: MPEG-H 3D Audio—The New Standard for Coding of Immersive Spatial Audio11 , IEEE Journal of Selected Topics in Signal Processing, IEEE, us, vol. 9, No. 5, Aug. 1, 2015 (Aug. 1, 2015), pp. 770-779.

Max Neuendorf (Fraunhofer) et al"Proposed CD of ISO/IEC 23008-3 3D Audio", 108. MPEG Meeting; Mar. 31, 2014-Apr. 4, 2014; Valencia; (Motion Picture Expert Group or ISO/IEC JTC1/SC29/WG11), No. m33178 ,Mar. 27, 2014.

McGrath, D. et al"Immersive Audio Coding for Virtual Reality Using a Metadata-assisted Extension of the 3GPP EVS Codec" CASSP 2019—2019 IEEE International Conference on Acoustics, Speech and Signal Processing (ICASSP), Brighton, United Kingdom, 2019, pp. 730-734, published in Apr. 2019.

Timmerer, Christian, "Immersive Media Delivery: Overview of Ongoing Standardization Activities" IEEE Communications Standards Magazine, Dec. 2017, pp. 2471-2825.

Dolby Laboratories Inc: "Dolby VRStream audio profile candidate—Description of Bitstream, Decoder, and Renderer plus informative Encoder Description", 3GPP Draft; S4-180806—Dolby Vrstream Audio Candidate—Description of Bitstream, Decoder and Renderer, 3RD Generation Partnership. Project (3GPP), Mobile Competence Centre ; 650, Route Des Lucioles ; vol. SA WG4, No. Rome, Italy;. Jul. 9-13, 2018 Jul. 6, 2018 (Jul. 6, 2018), XP051470545.

* cited by examiner

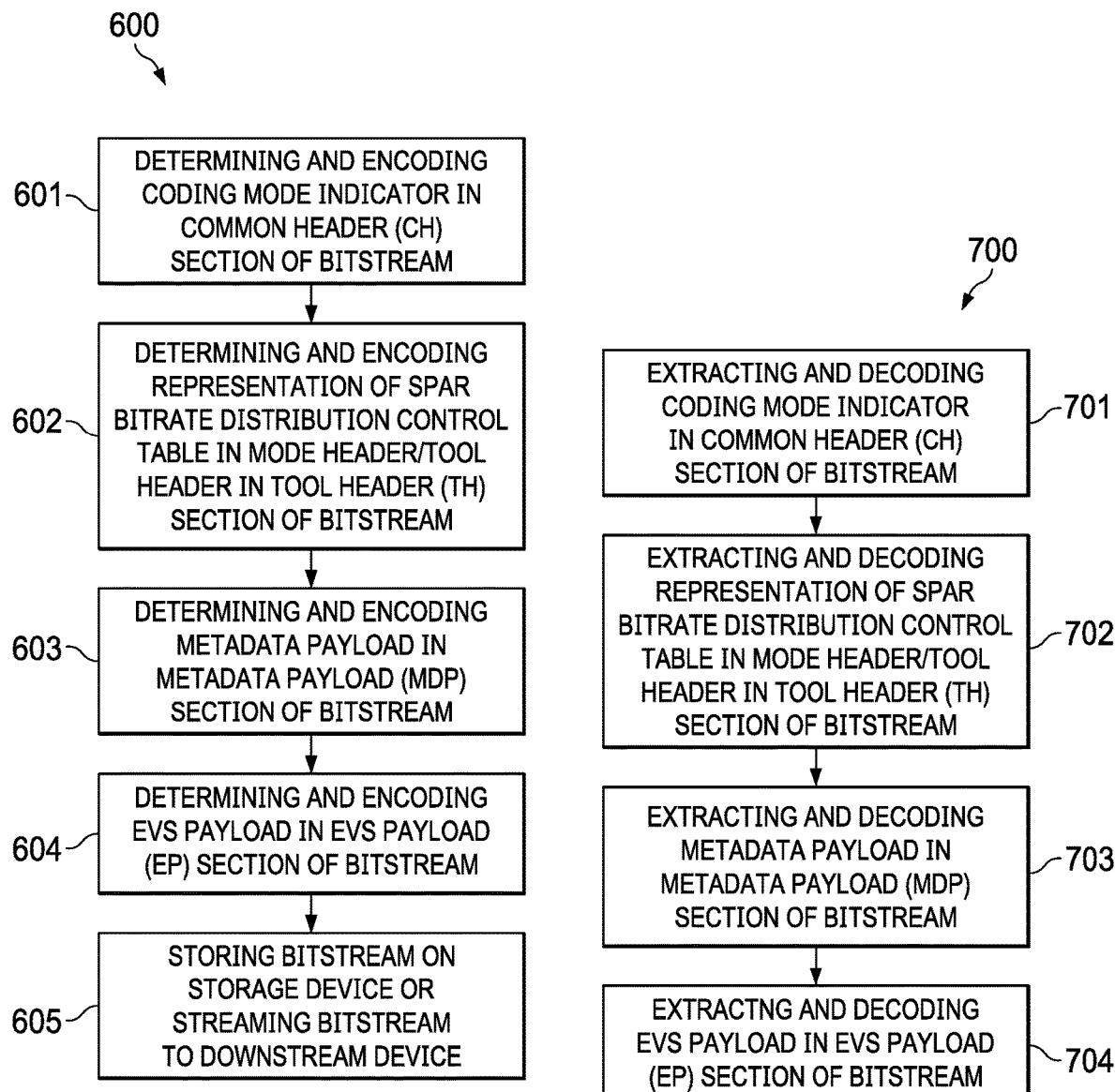

ENCODING AND DECODING IVAS BITSTREAMS

CROSS-REFERENCE TO RELATED APPLICATIONS

This application claims priority to United States Provisional Application No. 62/881,541, filed Aug. 1, 2019, United States Provisional Patent Application No. 62/927,894, filed Oct. 30, 2019, United States Provisional Patent Application No. 63/037,721, filed Jun. 11, 2020 and United States Provisional Patent Application No. 63/057,666, filed Jul. 28, 2020, each of which is hereby incorporated by reference in its entirety.

TECHNICAL FIELD

This disclosure relates generally to audio bitstream encoding and decoding.

BACKGROUND

Voice and video encoder/decoder ("codec") standard development has recently focused on developing a codec for immersive voice and audio services (IVAS). IVAS is expected to support a range of audio service capabilities, including but not limited to mono to stereo upmixing and fully immersive audio encoding, decoding and rendering. IVAS is intended to be supported by a wide range of devices, endpoints, and network nodes, including but not limited to: mobile and smart phones, electronic tablets, personal computers, conference phones, conference rooms, virtual reality (VR) and augmented reality (AR) devices, home theatre devices, and other suitable devices. These devices, endpoints and network nodes can have various acoustic interfaces for sound capture and rendering.

SUMMARY

Implementations are disclosed for encoding and decoding IVAS bitstreams.

In some implementations, a method of generating a bitstream for an audio signal, comprises: determining, using an immersive voice and audio services (IVAS) encoder, a coding mode indicator or coding tool indicator, the coding mode indicator or coding tool indicator indicating a coding mode or coding tool for the audio signal; encoding, using the IVAS encoder, the coding mode indictor or coding tool indicator in a common header (CH) section of an IVAS bitstream; determining, using the IVAS encoder, a mode header or tool header; encoding, using the IVAS encoder, the mode or tool header in a tool header (TH) section of the IVAS bitstream, wherein the TH section follows the CH section; determining, using the IVAS encoder, a metadata payload including spatial metadata; encoding, using the IVAS encoder, the metadata payload in a metadata payload (MDP) section of the IVAS bitstream, where the MDP section follows the CH section; determining, using the IVAS encoder, an enhanced voice services (EVS) payload, the EVS payload including EVS coded bits for each channel or downmix channel of the audio signal; and encoding, using the IVAS encoder, the EVS payload in an EVS payload (EP) section of the IVAS bitstream, where the EP section follows the CH section.

In some implementations, the IVAS bitstream is stored on a non-transitory computer-readable medium. In other implementations, the IVAS bitstream is streamed to a downstream device, wherein the coding mode or coding tool indicator, the mode header or tool header, the metadata payload and the EVS payload are extracted and decoded from the, CH, TH, MDP and EP sections of the IVAS bitstream, respectively, for use in reconstruction of the audio signal on the downstream device or another device.

In some implementations, a method of decoding a bitstream for an audio signal, comprises: extracting and decoding, using an immersive voice and audio services (IVAS) decoder, a coding mode indicator or coding tool indicator in a common header (CH) section of an IVAS bitstream, the coding mode indicator or coding tool indicator indicating a coding mode or coding tool for the audio signal; extracting and decoding, using the IVAS decoder, a mode header or tool header in the Tool Header (TH) section of the IVAS bitstream, the TH section following the CH section; extracting and decoding, using the IVAS decoder, a metadata payload from metadata payload (MDP) section of the IVAS bitstream, the MDP section following the CH section, the metadata payload including spatial metadata; and extracting and decoding, using the IVAS decoder, an enhanced voice services (EVS) payload from an EVS payload (EP) section of the IVAS bitstream, the EP section following the CH section, the EVS payload including EVS coded bits for each channel or downmix channel of the audio signal.

In some implementations, an audio decoder of a downstream device is controlled based on the coding mode indicator or coding tool indicator, the mode header or tool header, the EVS payload, and the metadata payload for use in reconstruction of the audio signal on the downstream device or another device. In other implementations, a representation of the coding mode indicator or coding tool indicator, the mode header or tool header, the EVS payload, and the metadata payload is stored on a non-transitory computer-readable medium.

In some implementations, a bitrate for each EVS coded channel or downmix channel is determined by a total available bits for EVS, a SPAR bitrate distribution control table and a bitrate distribution algorithm.

In some implementations, the CH is a multi-bit data structure, where one value of the multi-bit data structure corresponding to a spatial reconstruction (SPAR) coding mode and other values of the data structure correspond to other coding modes.

In some implementations, the preceding methods further comprise storing in or reading from, respectively, the TH section of the IVAS bitstream, an index offset for computing a row index of a spatial reconstruction (SPAR) bitrate distribution control table.

In some implementations, the preceding methods further comprise: storing in or reading from, respectively, the MDP section of the IVAS bitstream; a quantization strategy indicator; a bitstream coding strategy indicator; and quantized and coded real and imaginary parts of a set of coefficients.

In some implementations, the set of coefficients include prediction coefficients, direct coefficients, diagonal real coefficients and lower triangle complex coefficients.

In some implementations, the prediction coefficients are variable bit length based on entropy coding, and the direct coefficients, diagonal real coefficients and lower triangle complex coefficients are variable bit length based on a downmix configuration and entropy coding.

In some implementations, the quantization strategy indicator is a multi-bit data structure that indicates a quantization strategy.

In some implementations, the bitstream coding strategy indicator is a multi-bit data structure that indicates a number of bands of spatial metadata and a non-differential or time-differential entropy coding scheme.

In some implementations, the quantization of the coefficients is according to an EVS bitrate distribution control strategy that includes metadata quantization and an EVS bitrate distribution.

In some implementations, the preceding methods further comprise storing in or reading from, respectively, the EP section of the IVAS bitstream an EVS payload for EVS instances per $3^{rd}$ generation partnership project (3GPP) technical specification (TS) 26.445.

In some implementations, the preceding methods further comprise: determining a bitrate from the IVAS bitstream; reading an index offset from a spatial reconstruction (SPAR) tool header (TH) section of the IVAS bitstream; determining a table row index for the SPAR bitrate distribution control table using the index offset; reading quantization strategy bits and coding strategy bits from a metadata payload (MDP) section in the IVAS bitstream; unquantizing SPAR spatial metadata in the MDP section of the IVAS bitstream based on the quantization strategy bits and the coding strategy bits; determining an Enhanced Voice Services (EVS) bitrate for each channel in the IVAS bitstream using a total available EVS bits and the SPAR bitrate distribution control table; reading EVS coded bits from the EP section of the IVAS bitstream based on the EVS bitrate; decoding the EVS bits; and decoding the spatial metadata; and generating first order Ambisonics (FoA) output using the decoded EVS bits and the decoded spatial metadata.

Other implementations disclosed herein are directed to a system, apparatus and computer-readable medium. The details of the disclosed implementations are set forth in the accompanying drawings and the description below. Other features, objects and advantages are apparent from the description, drawings and claims.

Particular implementations disclosed herein provide one or more of the following advantages. The disclosed IVAS bitstream format is an efficient and robust bitstream format that supports a range of audio service capabilities, including but not limited to mono to stereo upmixing and fully immersive audio encoding, decoding and rendering. In some implementations, the IVAS bitstream format supports complex advance coupling (CACPL) for analyzing and downmixing stereo audio signals. In other implementations, the IVAS bitstream format supports spatial reconstruction (SPAR) for analyzing and downmixing first order Ambisonics (FoA) audio signals.

DESCRIPTION OF DRAWINGS

In the drawings, specific arrangements or orderings of schematic elements, such as those representing devices, units, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some implementations.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths, as may be needed, to affect the communication.

FIG. 6 is a flow diagram of a IVAS SPAR encoding process, according to an embodiment.

FIG. 7 is a flow diagram of an IVAS SPAR decoding process, according to an embodiment.

The same reference symbol used in various drawings indicates like elements.

DETAILED DESCRIPTION

In the following detailed description, numerous specific details are set forth to provide a thorough understanding of the various described embodiments. It will be apparent to one of ordinary skill in the art that the various described implementations may be practiced without these specific details. In other instances, well-known methods, procedures, components, and circuits, have not been described in detail so as not to unnecessarily obscure aspects of the embodiments. Several features are described hereafter that can each be used independently of one another or with any combination of other features.

Nomenclature

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." The terms "determined," "determines," or "determining" are to be read as obtaining, receiving, computing, calculating, estimating, predicting or deriving. In addition, in the following description and claims, unless defined otherwise, all technical and scientific terms used herein have the same meaning as commonly understood by one of ordinary skills in the art to which this disclosure belongs.

IVAS System Overview

Figure 1:
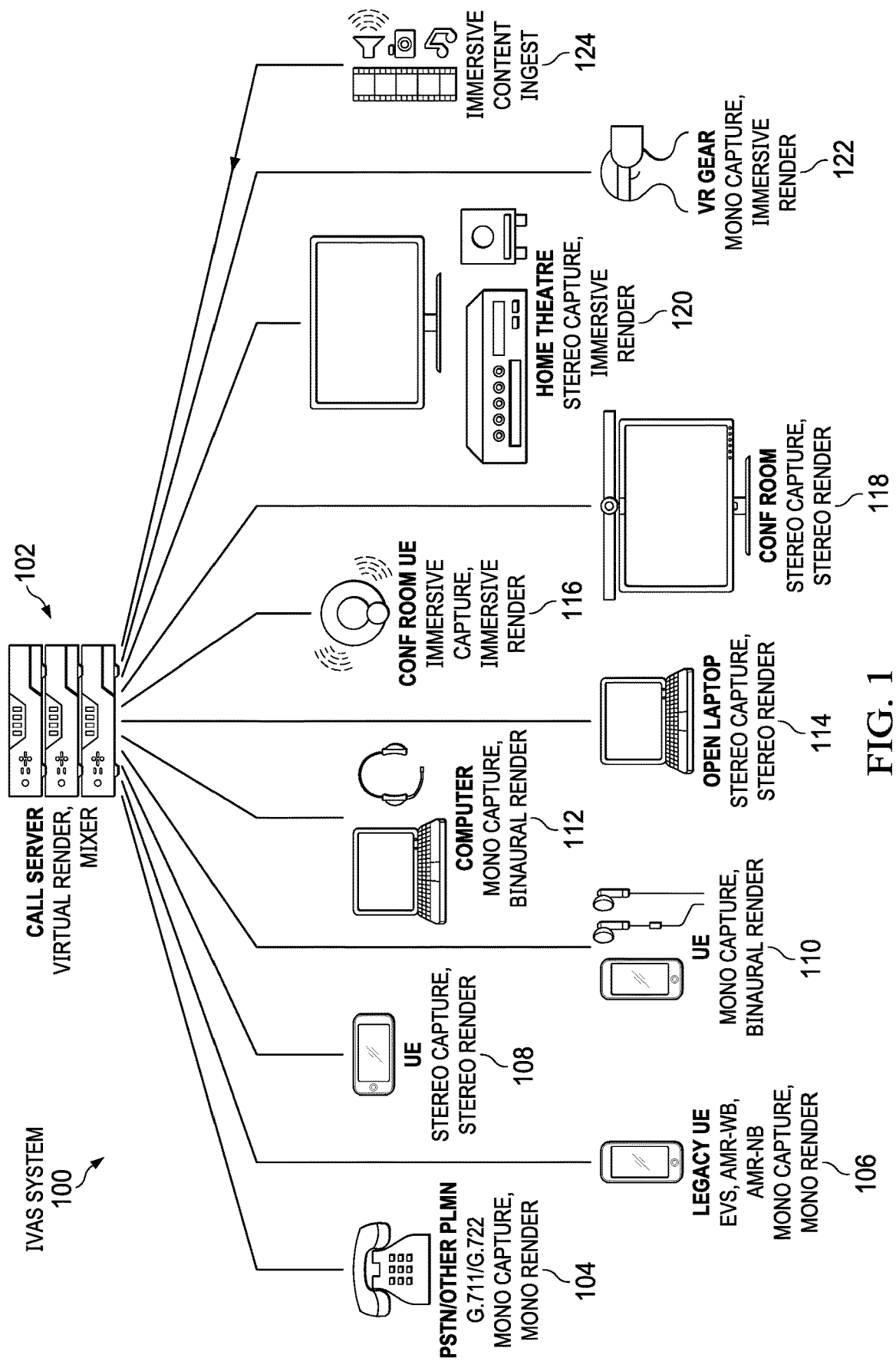
FIG. 1 illustrates an IVAS system, according to an embodiment.

FIG. 1 illustrates an IVAS system 100, according to one or more implementations. In some implementations, various devices communicate through call server 102 that is configured to receive audio signals from, for example, a public switched telephone network (PSTN) or a public land mobile network device (PLMN) illustrated by PSTN/OTHER PLMN 104. IVAS system 100 supports legacy devices 106 that render and capture audio in mono only, including but not limited to: devices that support enhanced voice services (EVS), multi-rate wideband (AMR-WB) and adaptive multi-rate narrowband (AMR-NB). IVAS system 100 also supports user equipment (UE) 108, 114 that captures and renders stereo audio signals, or UE 110 that captures and binaurally renders mono signals into multichannel signals. IVAS system 100 also supports immersive and stereo signals captured and rendered by video conference room systems 116, 118, respectively. IVAS system 100 also supports stereo capture and immersive rendering of stereo audio signals for computers 112, home theatre systems 120, and mono capture and immersive rendering of audio signals for virtual reality (VR) gear 122 and immersive content ingest 124.

Example IVAS Encoding/Decoding Systems

Figure 2:
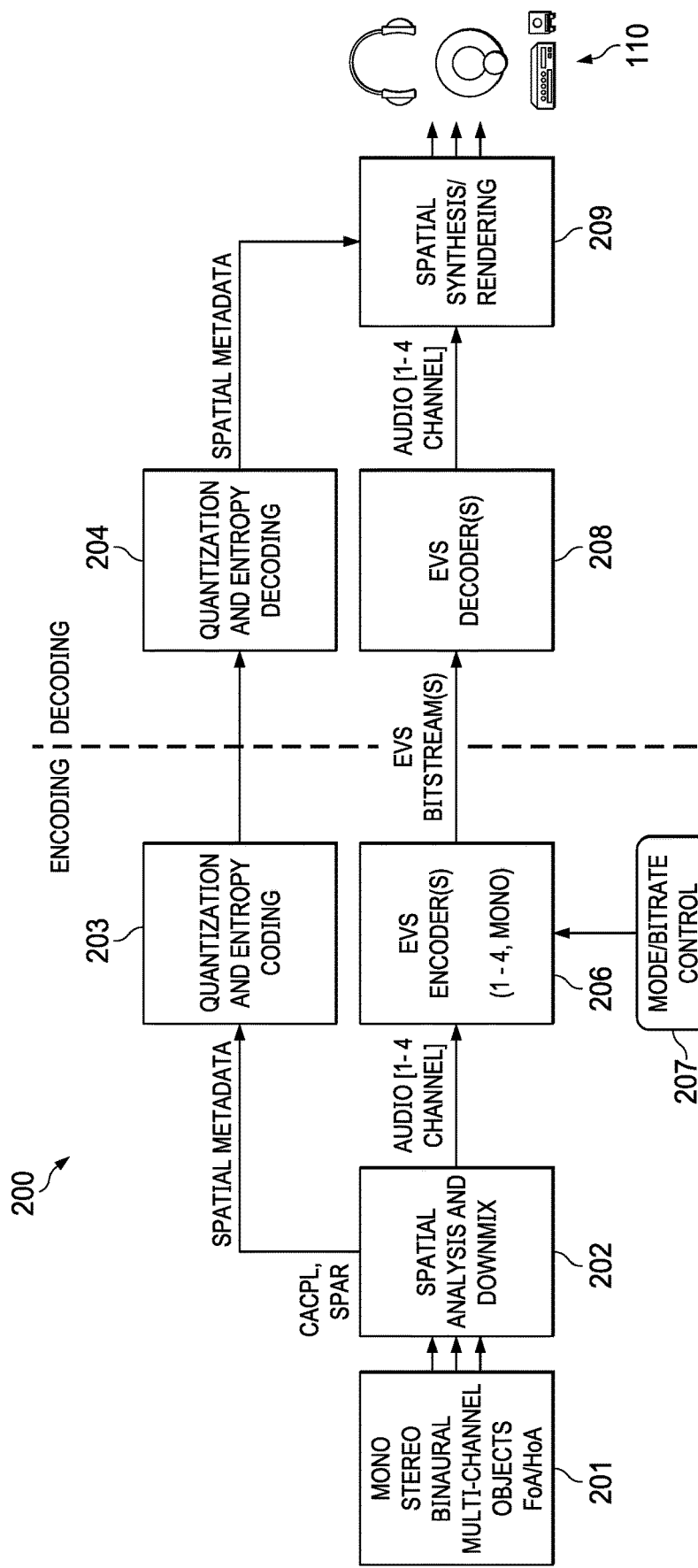
FIG. 2 is a block diagram of a system for encoding and decoding IVAS bitstreams, according to an embodiment.

FIG. 2 is a block diagram of a system 200 for encoding and decoding IVAS bitstreams, according to one or more implementations. For encoding, an IVAS encoder includes spatial analysis and downmix unit 202 that receives audio data 201, including but not limited to: mono signals, stereo signals, binaural signals, spatial audio signals (e.g., multi-channel spatial audio objects), FoA, higher order Ambisonics (HoA) and any other audio data. In some implementations, spatial analysis and downmix unit 202 implements CACPL for analyzing/downmixing stereo audio signals and/or SPAR for analyzing/downmixing FoA audio signals. In other implementations, spatial analysis and downmix unit 202 implements other formats.

The output of spatial analysis and downmix unit 202 includes spatial metadata, and 1-4 channels of audio. The spatial metadata is input into quantization and entropy coding unit 203 which quantizes and entropy codes the spatial data. In some implementations, quantization can include fine, moderate, course and extra course quantization strategies and entropy coding can include Huffman or Arithmetic coding. Enhanced voice services (EVS) encoding unit 206 encodes the 1-4 channels of audio into one or more EVS bitstreams.

In some implementations, EVS encoding unit 206 complies with 3GPP TS 26.445 and provides a wide range of functionalities, such as enhanced quality and coding efficiency for narrowband (EVS-NB) and wideband (EVS-WB) speech services, enhanced quality using super-wideband (EVS-SWB) speech, enhanced quality for mixed content and music in conversational applications, robustness to packet loss and delay jitter and backward compatibility to the AMR-WB codec. In some implementations, EVS encoding unit 206 includes a pre-processing and mode selection unit that selects between a speech coder for encoding speech signals and a perceptual coder for encoding audio signals at a specified bitrate based on mode/bitrate control 207. In some implementations, the speech encoder is an improved variant of algebraic code-excited linear prediction (ACELP), extended with specialized LP-based modes for different speech classes. In some implementations, the audio encoder is a modified discrete cosine transform (MDCT) encoder with increased efficiency at low delay/low bitrates and is designed to perform seamless and reliable switching between the speech and audio encoders.

In some implementations, an IVAS decoder includes quantization and entropy decoding unit 204 configured to recover the spatial metadata, and EVS decoder(s) 208 configured to recover the 1-4 channel audio signals. The recovered spatial metadata and audio signals are input into spatial synthesis/rendering unit 209, which synthesizes/renders the audio signals using the spatial metadata for playback on various audio systems 210.

Example IVAS/SPAR CODEC

Figure 3:
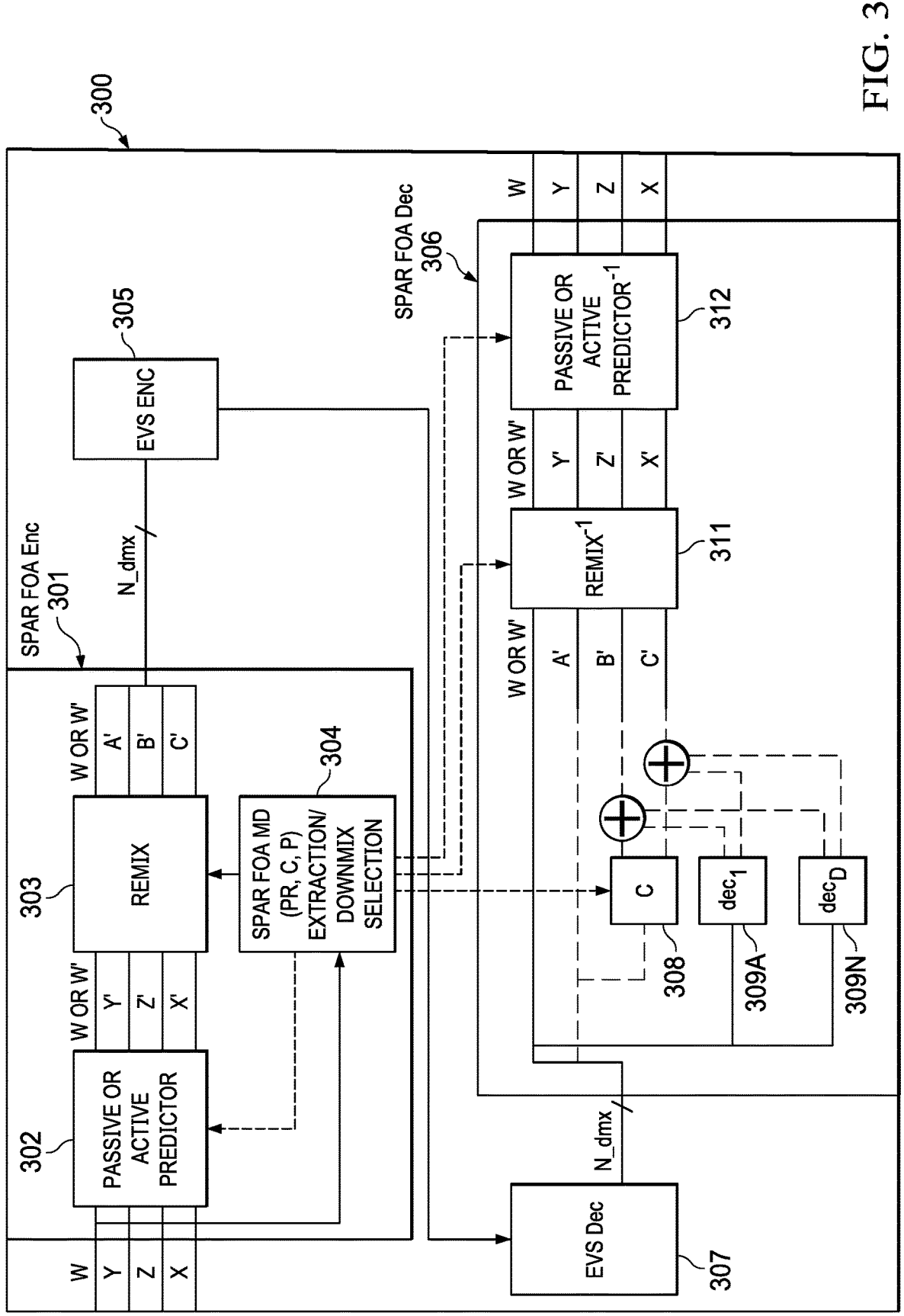
FIG. 3 is a block diagram of a FoA coder/decoder ("codec") for encoding and decoding IVAS bitstreams in FoA format, according to an embodiment.

FIG. 3 is a block diagram of FoA codec 300 for encoding and decoding FoA in SPAR format, according to some implementations. FoA codec 300 includes SPAR FoA encoder 301, EVS encoder 305, SPAR FoA decoder 306 and EVS decoder 307. FoA codec 300 converts a FoA input signal into a set of downmix channels and parameters used to regenerate the input signal at decoders 306, 307. The downmix signals can vary from 1 to 4 channels and the parameters include prediction coefficients (PR), cross-prediction coefficients (C), and decorrelation coefficients (P). Note that SPAR is a process used to reconstruct an audio signal from a downmix version of the audio signal using the PR, C and P parameters, as described in further detail below.

Note that the example implementation shown in FIG. 3 assumes a passive W channel, and depicts a nominal 2-channel downmix, where the W channel is sent unmodified with a single predicted channel Y' to decoder 306. In other implementations, W can be an active channel. An active W channel allows some mixing of X, Y, Z channels into the W channel as follows:

$$W' = W + f^* pr_y^* Y + f^* pr_z^* Z + f^* pr_x^* X,$$

where f is a constant (e.g. 0.5) that allows mixing of some of the X, Y, Z channels into the W channel and pry, prx and prz are the prediction (PR) coefficients. In passive W, f=0 so there is no mixing of X, Y, Z channels into the W channel.

As described in further detail below, the C coefficients allow some of the X and Z channels to be reconstructed from Y', and the remaining channels are reconstructed by decorrelated versions of the W channel, as described in further detail below.

In some implementations, SPAR FoA encoder 301 includes passive/active predictor unit 302, remix unit 303 and extraction/downmix selection unit 304. Passive/active predictor receives FoA channels in a 4-channel B-format (W, Y, Z, X) and computes predicted channels (W or W', Y', Z', X'). Note that the W channel is an omni-directional polar pattern, containing all sounds in the sphere, coming from all directions at equal gain and phase, X is a figure-8 bi-directional polar pattern pointing forward, Y is a figure-8 bi-directional polar pattern pointing to the left, and Z is a figure-8 bi-directional polar pattern pointing up.

Extraction/downmix selection unit 304 extracts SPAR FoA metadata from a metadata payload section of the IVAS bitstream, as described in more detail below. Passive/active predictor unit 302 and remix unit 303 use the SPAR FoA metadata to generate remixed FoA channels (W or W', A', B', C'), which are input into EVS encoder 305 to be encoded into an EVS bitstream, which is encapsulated in the IVAS bitstream sent to decoder 306. Note in this example the Ambisonic B-format channels are arranged in the AmbiX convention. However, other conventions, such as the Furse-Malham (FuMa) convention (W, X, Y, Z) can be used as well.

Referring to SPAR FoA decoder 306, the EVS bitstream is decoded by EVS decoder 307 resulting in N (e.g., N=4) downmix channels. In some implementations, SPAR FoA decoder 306 performs a reverse of the operations performed by SPAR encoder 301. For example, the remixed FoA channels (W or W', A', B', C') are recovered from the N downmix channels using the SPAR FoA spatial metadata. The remixed SPAR FoA channels are input into inverse mixer 311 to recover the predicted SPAR FoA channels (W or W', Y', Z', X'). The predicted SPAR FoA channels are then input into inverse predictor 312 to recover the original unmixed SPAR FoA channels (W, Y, Z, X). Note that in this two-channel example, decorrelator blocks 309a (deci) . . . 309n (dec$_D$) are used to generate decorrelated versions of the W channel using a time domain or frequency domain decorrelator. The decorrelated channels are used in combination with the SPAR FoA metadata to reconstruct fully or parametrically the X and Z channels.

In some implementations, depending on the number of downmix channels one of the FoA inputs is sent to SPAR FoA decoder 306 intact (the W channel), and one to three of the other channels (Y, Z, and X) are either sent as residuals or completely parametrically to SPAR FoA decoder 306. The PR coefficients, which remain the same regardless of the number of downmix channels N, are used to minimize predictable energy in the residual downmix channels. The C coefficients generated by block 308 are used to further assist in regenerating fully parametrized channels from the residuals. As such, the C coefficients are not required in the one and four channel downmix cases, where there are no residual channels or parameterized channels to predict from. The P coefficients are used to fill in the remaining energy not accounted for by the PR and C coefficients. The number of P coefficients is dependent on the number of downmix channels N in each band. In some implementations, SPAR PR coefficients (Passive W only) are calculated as follows.

Step 1. Predict all side signals (Y, Z, X) from the main W signal using Equation [1].

$$\begin{bmatrix} W \\ Y' \\ Z' \\ X' \end{bmatrix} = \begin{bmatrix} 1 & 0 & 0 & 0 \\ -pr_Y & 1 & 0 & 0 \\ -pr_Z & 0 & 1 & 0 \\ -pr_X & 0 & 0 & 1 \end{bmatrix} \begin{bmatrix} W \\ Y \\ Z \\ X \end{bmatrix}, \quad [1]$$

where, as an example, the prediction parameter for the predicted channel Y' is calculated using Equation [2].

$$pr_Y = \frac{R_{YW}}{\max(R_{WW}, \epsilon)} \frac{1}{\max\left(1, \sqrt{|R_{YY}|^2 + |R_{ZZ}|^2 + |R_{XX}|^2}\right)}, \quad [2]$$

where $R_{AB}$=cov(A, B) are elements of the input covariance matrix corresponding to signals A and B. Similarly, the Z' and X' residual channels have corresponding prediction parameters, prz and prx. PR is the vector of the prediction coefficients $[pr_y, pr_z, pr_x]^T$.

Step 2. Remix the W and predicted (Y', Z', X') signals from most to least acoustically relevant, wherein "remixing" means reordering or re-combining signal based on some methodology, $$\begin{bmatrix} W \\ A' \\ B' \\ C' \end{bmatrix} = [\text{remix}] \begin{bmatrix} W \\ Y' \\ Z' \\ X' \end{bmatrix}. \quad [3]$$

One implementation of remixing is re-ordering of the input signals to W, Y', X', Z', given the assumption that audio cues from left and right are more acoustically relevant than front-back, and front-back cues are more acoustically relevant than up-down cues.

Step 3. Calculate the covariance of the 4 channel post-prediction and remixing downmix as shown in Equations [4] and [5].

$$R_{pr} = [\text{remix}]PR.R.PR^H[\text{remix}], \quad [4]$$

$$R_{pr} = \begin{pmatrix} R_{WW} & R_{Wd} & R_{Wu} \\ R_{dW} & R_{dd} & R_{du} \\ R_{uW} & R_{ud} & R_{uu} \end{pmatrix}. \quad [5]$$

where d represents the extra downmix channels beyond W (i.e., 2nd to Ndmx channels), and u represents the channels that need to be wholly regenerated (i.e. (Ndmx+1)th to 4th channels).

For the example of a WABC downmix with 1-4 channels, d and u represent the following channels shown in Table I:

TABLE 1 d and u channel representations

| N | d channels | U channels |
|---|---|---|
| 1 | — | A', B', C' |
| 2 | A' | B', C' |
| 3 | A', B' | C' |
| 4 | A', B', C' | — |

Of main interest to the calculation of SPAR FoA metadata are the R_dd, R_ud and R_uu quantities. From the R_dd, R_ud and R_uu quantities, the system determines if it is possible to cross-predict any remaining portion of the fully parametric channels from the residual channels being sent to the decoder. In some implementations, the required extra C coefficients are given by:

$$C = R_{ud}(R_{dd} + I \max(\epsilon, tr(R_{dd})*0.005))^{-1} \quad [6]$$

Therefore, the C parameter has the shape (1×2) for a 3-channel downmix, and (2×1) for a 2-channel downmix.

Step 4. Calculate the remaining energy in parameterized channels that must be reconstructed by decorrelators. The residual energy in the upmix channels Res_uu is the difference between the actual energy R_uu (post-prediction) and the regenerated cross-prediction energy Reg_uu.

$$Reg_{uu} = CR_{dd}C^H, \quad [7]$$

$$Res_{uu} = R_{uu} - Reg_{uu} \quad [8]$$

$$P = \sqrt{\frac{Res_{uu}}{\max\left(\epsilon, R_{WW}, \sqrt{tr(|Res_{uu}|)}\right)}}. \quad [9]$$

P is also a covariance matrix, hence is Hermitian symmetric, and thus only parameters from the upper or lower triangle need be sent to decoder 306. The diagonal entries are real, while the off-diagonal elements may be complex.

Example Encoding/Decoding of IVAS Bitstreams

As described in reference to FIGS. 2 and 3, IVAS bitstream(s) are encoded and decoded by an IVAS codec. In some implementations, an IVAS encoder determines and encodes a coding tool indicator and sampling rate indicator in a common header (CH) section of the IVAS bitstream. In some implementations, the coding tool indicator comprises values corresponding to coding tools and the sampling rate indicator comprises values indicating a sampling rate. The IVAS encoder determines and encodes an EVS payload in an EVS payload (EP) section of the bitstream. The EP section follows the CH section. The IVAS encoder determines and encodes a metadata payload in metadata payload (MDP) section of the bitstream. In some implementations, the MDP section follows the CH section. In other implementations, the MDP section follows the EP section of the bitstream or the EP section follows the MDP section of the bitstream. In some implementations, the IVAS encoder stores the bitstream on a non-transitory, computer-readable medium or streams the bitstream to a downstream device. In other implementations, the IVAS encoder includes the device architecture shown in FIG. 8

In some implementations, an IVAS decoder receives the IVAS bitstream and extracts and decodes audio data that was encoded in the IVAS format by the IVAS encoder. The IVAS decoder extracts and decodes the coding tool indicator and the sampling rate indicator in the CH section of the IVAS bitstream. The IVAS decoder extracts and decodes the EVS payload in the EP section of the bitstream. The EP section follows the CH section. The IVAS decoder extracts and decodes the metadata payload in MDP section of the bitstream. The MDP section follows the CH section. In other implementations, the MDP section follows the EP section of the bitstream or the EP section follows the MDP section of the bitstream. In some implementations, the IVAS system controls an audio decoder based on the coding tool, the sampling rate, the EVS payload, and the metadata payload. In other implementations, the IVAS system or stores a representation of the coding tool, the sampling rate, the EVS payload, and the metadata payload on a non-transitory, computer-readable medium. In some implementations, the IVAS decoder includes the device architecture shown in FIG. 8.

In some implementations, the IVAS coding tool indicator is a multi-bit data structure. In other implementations, the IVAS coding tool indicator is a three-bit data structure, where a first value of the three-bit data structure corresponds to a multi mono coding tool, a second value of the three-bit data structure corresponds to a CACPL coding tool and a third value of the three-bit data structure corresponds to another coding tool. In other implementations, the IVAS coding tool indicator is a two-bit data structure indicating from one to four IVAS coding tools or a 1-bit data structure indicating one or two IVAS coding tools. In other implementations, the IVAS coding tool indicator includes three or more bits to indicate different IVAS coding tools.

In some implementations, the input sampling rate indicator is a multi-bit data structure indicating different input sampling rates. In some implementations, the input sampling rate indicator is a two-bit data structure, where a first value of the two-bit data structure indicates an 8 k Hz sampling rate, a second value of the two-bit data structure indicates a 16 kHz sampling rate, a third value of the two-bit data structure indicates a 32 kHz sampling rate and a fourth value of the two-bit data structure indicates a 48 kHz sampling rate. In other implementations, the input sampling rate indicator is a one-bit data structure indicating from one or two sampling rates. In other implementations, the input sampling rate indicator includes three or more bits indicating different sampling rates.

In some implementations, the system stores in or reads from the EP section of the bitstream a number of EVS channels: a number of EVS channels indicator; a bitrate (BR) extraction mode indicator; EVS BR data; and EVS payloads for all channels, as described in $3^{rd}$ generation partnership project (3GPP) technical specification (TS) 26.445, in that order.

In other implementations, the system stores in or reads from the EP section of the bitstream a number of EVS channels indicator.

In other implementations, the system stores in or reads from the EP section of the bitstream a bitrate (BR) extraction mode indicator.

In other implementations, the system stores in or reads from the EP section of the bitstream EVS BR data.

In other implementations, the system stores in or reads from the EP section of the bitstream EVS payloads for all channels, as described in $3^{rd}$ generation partnership project (3GPP) technical specification (TS) 26.445, in that order.

In some implementations, the IVAS system stores in or reads from, the MDP section of the data stream: a coding technique indicator; a number of bands indicator; an indicator indicating delay configuration of a filterbank; an indicator of quantization strategy; an entropy coder indicator; a probability model type indicator; a coefficient real part; a coefficient imaginary part; and one or more coefficients.

In other implementations, the IVAS system stores in or reads from, the MDP section of the data stream a coding technique indicator.

In other implementations, the IVAS system stores in or reads from the MDP section of the data stream a number of bands indicator.

In other implementations, the IVAS system stores in or reads from the MDP section of the data stream an indicator indicating delay configuration of a filterbank.

In other implementations, the IVAS system stores in or reads from the MDP section of the data stream an indicator of quantization strategy.

In other implementations, the IVAS system stores in or reads from the MDP section of the data stream an entropy coder indicator.

In other implementations, the IVAS system stores in or reads from the MDP section of the data stream a probability model type indicator.

In other implementations, the IVAS system stores in or reads from the MDP section of the data stream a coefficient real part. In other implementations, the IVAS system stores in or reads from the MDP section of the data stream a coefficient imaginary part.

In other implementations, the IVAS system stores in or reads from the MDP section of the data stream and one or more coefficients.

Some examples of IVAS bitstream formats are illustrated below.

Example IVAS Bitstream Formats—3 Subdivision Format

In some implementations, an IVAS bitstream format includes 3 subdivisions as follows.

Common Header (CH)
EVS Payload (EP)
Metadata Payload (MDP)

In some implementations, the parameters in each field in each subdivision and their respective bit allocations are described below.

Common Header (CH):

| | | |
|---|---|---|
| IVAS Coding Tool | 3 bits | 000-multi mono<br>001-CACPL<br>010-other<br>011-111: reserved |
| Input Sampling Rate | 2 bits | 00-8 kHz<br>01-16 kHz<br>10-32 kHz<br>11-48 kHz |

EVS Payload (EP):

| | |
|---|---|
| Number of EVS Channels (numEVS_Ch) | 4 bits: 1-16 channels |
| BR Extraction Mode (BRM) | 2 bits<br>00-indicates EVS nominal bitrate<br>01-indicates actual bitrate (anything between 7.2-128 kbps at 50/100 bps granularity)<br>10-indicates that BR ratios have been encoded<br>11-reserved |
| EVS BRs | Extracted based on BRM<br>If BRM == 00<br>4 bits * numEVS_Ch<br>Bitrate can be 7200, 8000, 9600, 13200, 16400, 24400, 32000, 48000, 64000, 96000, 12800<br>If BRM == 01<br>11 bits * numEVS_Ch<br>Bitrate can be between 7200 and 128000 at 50 bps granularity till 48000 and 100 bps above 48000 (to keep total number of BRs below 2048)<br>If BRM == 10<br>7 + 3*(numEVS_Ch)<br>7 bits to indicate highest BR (hBR) among all EVS channels (from 7200 to 128000 at 1000 bps granularity)<br>3 bits per channel for rest of the channels indicating the fraction of highest bitrate.<br>other bitrates can be hBR*n where n can be between ⅛ to ⅝. |
| EVS Payload for numEVS_Ch | The EVS payload will be parsed per 3 GPP TS 26.445 |

Metadata Payload (MDP):

| CACPL | Multi Mono | Others |
|---|---|---|
| 1 bit indicating coding technique:<br>Full Parametric (FP), Mid-Residual (MR) or a hybrid (HY) of FP and MR<br>0-FP or HY (both a and b coefficients are present)<br>1-MR (only a is present)<br>2 bits indicating the number of bands<br>00-12 bands<br>01-24 bands<br>10-36 bands<br>11-reserved<br>Actual number of bands will be decided based on the sampling rate in IVAS CH and this field.<br>2 bits indicating delay configuration of filterbank<br>00-1 ms<br>01-2 ms<br>10-4 ms | | |

| CACPL | Multi Mono | Others |
|---|---|---|
| 11-reserved<br>2 bits indicating quantization strategy<br>00-fine<br>01-moderate<br>10-coarse<br>11-extra coarse<br>2 bits indicating entropy coder<br>00-Huffman<br>01-Arithmetic<br>10-No entropy coding<br>11-reserved<br>1 bit-Type of probability model (This bit is encoded only If entropy coder is 00 or 01)<br>0-Absolute probability model<br>1-Differential probability model<br>"a" coefficients real part (Huffman/Arithmetic/No entropy coded) | | |

| CACPL | Multi Mono | Others |
|---|---|---|
| "a" coefficients imaginary part (Huffman/Arithmetic/No entropy coded)<br>"b" coefficients (Huffman/Arithmetic/No entropy coded) | | |

An advantage of the IVAS bitstream format embodiment described above is that it efficiently and compactly encodes data that supports a range of audio service capabilities, including but not limited to mono to stereo upmixing and fully immersive audio encoding, decoding and rendering. It also supports by a wide range of devices, endpoints, and network nodes, including but not limited to: mobile and smart phones, electronic tablets, personal computers, conference phones, conference rooms, virtual reality (VR) and augmented reality (AR) devices, home theatre devices, and other suitable devices, each of which can have various acoustic interfaces for sound capture and rendering. The IVAS bitstream format is extensible so that it can readily evolve with the IVAS standard and technology.

Example IVAS Bitstream Formats—4 Subdivision Format

The following description of a further embodiment will focus on the differences between it and the previously described embodiment. Therefore, features which are common to both embodiments may be omitted from the following description, and if so it should be assumed that features of the previously described embodiments are or at least can be implemented in the further embodiment, unless the following description thereof requires otherwise. Additionally, when a feature is taken from the implementation disclosed below and added to a claim, the feature may not be related or inextricably linked to the other features of the implementation.

In other implementations, the IVAS bitstream includes 4 subdivisions as follows.

---
Common Header (CH)
Common Spatial Coding Tool Header (CTH)
EVS payload-EP or Meta data payload (MDP)
Metadata payload-MDP or EVS payload (EP)
---

In some implementations, an IVAS encoder determines and encodes a coding tool indicator in a common header (CH) section of the IVAS bitstream. The coding tool indicator comprises values corresponding to coding tools. The IVAS encoder determines and encodes a row index to an IVAS bitrate distribution control table in a common spatial coding tool header (CTH) section of the IVAS bitstream. The CTH section follows the CH section. The IVAS encoder determines and encodes an EVS payload in an EVS payload (EP) section of the IVAS bitstream. The EP section follows the CH section. The IVAS encoder determines and encodes a metadata payload in metadata payload (MDP) section of the IVAS bitstream. The MDP section follows the CH section.

In some implementations, the EP section comes before or after the MDP section depending on one or more parameters. In some implementations, the one or more parameters include a backward compatibility mode of a mono downmix of a multichannel input with nominal bitrate modes, as described in 3GPP TS 26.445.

In some implementations, the IVAS system stores the IVAS bitstream on a non-transitory, computer-readable medium. In other implementations, the IVAS system streams the bitstream to a downstream device. In some implementations, the IVAS encoder includes the device architecture shown in FIG. 8

In some implementations, an IVAS decoder receives the IVAS bitstream and extracts and decodes audio data encoded in the IVAS format by the IVAS encoder. The IVAS decoder extracts and decodes the coding tool indicator in the CH section of the IVAS bitstream. The IVAS decoder extracts and decodes the index to the IVAS bitrate distribution control table. The IVAS decoder extracts and decodes the EVS payload in the EP section of the IVAS bitstream. The EP section follows the CH section. The IVAS decoder extracts and decodes the metadata payload in MDP section of the IVAS bitstream. The MDP section follows the CH section.

In some implementations, the EP section comes before or after the MDP section depending on one or more parameters. In some implementations, the one or more parameters include a backward compatibility mode of a mono downmix of a multichannel input with nominal bitrate modes, as described in 3GPP TS 26.445.

In some implementations, the IVAS system controls an audio decoder based on the coding tool, the index to the IVAS bitrate distribution control table, the EVS payload, and the metadata payload. In other implementations, the IVAS system stores a representation of the coding tool, the index to the IVAS bitrate distribution control table, the EVS payload, and the metadata payload on a non-transitory, computer-readable medium. In some implementations, the IVAS decoder includes the device architecture shown in FIG. 8.

Common Header (CH):

| IVAS Spatial Coding Tool | 3 bits |
|---|---|
| | 000-multi mono |
| | 001-CACPL |
| | 010-other |
| | 011-111: reserved |

Common Spatial Coding Tool Header (CTH):

| | Variable length |
|---|---|
| Common Spatial Coding Tool Header | In some implementations the length of this field depends on the number of IVAS operating bitrate entries in the IVAS bitrate distribution control table. In some implementations, the value of this field is an index offset that points to an IVAS bitrate distribution control table row index (the row index is relative to the first entry index of the IVAS operating bitrate) |

Metadata Payload (MDP):

An advantage of the IVAS bitrate distribution control table is that it captures information about spatial coding modes, so that the information about the spatial coding modes need not be included in the MDP section.

| CACPL | | Multi Mono | Others |
|---|---|---|---|

2 bits indicating number bands of the filterbank
00-12 bands
01-24 bands
10-36 bands
11-reserved
In some implementations, the actual number of bands is determined based on the IVAS bitrate distribution control table index pointed to by the CTH section and this field.
2 bits indicating delay configuration of the filterbank
00-1 ms
01-2 ms

| CACPL | Multi Mono | Others |
|---|---|---|

10-4 ms
11-reserved
2 bits indicating quantization strategy
00-fine
01-moderate
10-coarse
11-extra coarse
2 bits indicating entropy coder
00-Huffman
01-Arithmetic
10-No entropy coding
11-reserved
1 bit-Type of probability model (This bit is encoded only If entropy coder is 00 or 01)
0-Absolute probability model
1-Differential probability model
"a" coefficients real part (Huffman/Arithmetic/No entropy coded)
"a" coefficients imaginary part (Huffman/Arithmetic/No entropy coded)
"b" coefficients (Huffman/Arithmetic/No entropy coded)

EVS Payload (EP):

This section of the payload contains EVS coded bits for one or more audio downmix channels. In some implementations, the total number of bits in this section can be given by $\sum_{i=0}^{N-1}(EVS_{BR(i)}*stride_{secs})$, where N (e.g., N=4) is the number of required audio downmix channels to be coded, EVS_BR (i) is the calculated EVS bitrate for the $i^{th}$ audio downmix channel and stride_secs is the input stride length in seconds.

In some implementations, each table entry in the IVAS bitrate distribution control table has enough information to extract the bitrate of each EVS instance from the total bits allocated for EVS. This structure provides the advantage that no additional header information is required in the EVS payload to extract bits for each EVS instance.

| | |
|---|---|
| EVS payload for all audio downmix channels | The EVS payload will be parsed as per 3 GPP TS 26.445 |

In some implementations, parameters in an IVAS bitrate distribution control table have the following values:

| | |
|---|---|
| Input Format | Stereo-1<br>Planar FoA-2<br>FoA-3 |
| Bandwidth (BW) | NB (Narrow Band)-0<br>WB (Wide Band)-1<br>SWB (Super Wide Band)-2<br>FB (Full band)-3 |
| Allowed Spatial Coding Tool | FP (Full Parametric)-0<br>MR (Mid-Residual)-1 |
| Transition Mode | MR to FP Transition-1<br>Otherwise-0 |
| Mono downmix backward compatible mode: | If Mid or W, channel should be backward compatible with nominal bitrate modes of 3 GPP TS 26. 455-1<br>Otherwise-0 |

An example IVAS bitrate distribution control table is as follows.

| IVAS Operating bitrate | Input format | BW | Spatial Audio Coding Mode | Transition Mode | Mono Downmix Backward Compatibility Mode | EVS Target Bitrate | BR RATIO | EVS Minimum Bitrate | EVS BR deviation steps (bps) |
|---|---|---|---|---|---|---|---|---|---|
| 16.4 | 1 | 1 | 1 | 0 | 0 | 11400 | (1, 0) | 9000 | (200, 400, 800) |
| 16.4 | 1 | 2 | 1 | 0 | 0 | 11400 | (1, 0) | 9000 | (200, 400, 800) |
| 16.4 | 1 | 2 | 1 | 0 | 1 | 9600 | (1, 0) | 9600 | (0, 0, 0) |
| 24.4 | 1 | 1 | 1 | 0 | 0 | 19200 | (1, 0) | 16400 | (200, 400, 800) |
| 24.4 | 1 | 1 | 2 | 0 | 0 | 19200 | (3, 2) | 16400 | (50, 100, 200) |
| 24.4 | 1 | 1 | 1 | 1 | 0 | 19200 | (3, 2) | 16400 | (50, 100, 200) |
| 24.4 | 2 | 1 | 1 | 0 | 0 | 16400 | (1, 0, 0) | 13200 | (200, 400, 800) |
| 24.4 | 1 | 2 | 1 | 0 | 0 | 19200 | (1, 0) | 16400 | (200, 400, 800) |
| 24.4 | 1 | 2 | 2 | 0 | 0 | 19200 | (3, 2) | 16400 | (50, 100, 200) |
| 24.4 | 1 | 2 | 1 | 1 | 0 | 19200 | (3, 2) | 16400 | (50, 100, 200) |
| 24.4 | 1 | 2 | 2 | 0 | 1 | 19200 | (1, 1) | 19200 | (0, 0, 0) |

-continued

| IVAS Operating bitrate | Input format | BW | Spatial Audio Coding Mode | Transition Mode | Mono Downmix Backward Compatibility Mode | EVS Target Bitrate | BR RATIO | EVS Minimum Bitrate | EVS BR deviation steps (bps) |
|---|---|---|---|---|---|---|---|---|---|
| 24.4 | 2 | 2 | 1 | 0 | 0 | 16400 | (1, 0, 0) | 13200 | (200, 400, 800) |
| 24.4 | 2 | 2 | 1 | 0 | 1 | 13200 | (1, 0, 0) | 13200 | (0, 0, 0) |
| 24.4 | 1 | 3 | 1 | 0 | 0 | 19200 | (1, 0) | 16400 | (200, 400, 800) |
| 32 | 1 | 1 | 2 | 0 | 0 | 28000 | (3, 2) | 24400 | (50, 100, 200) |
| 32 | 2 | 1 | 1 | 0 | 0 | 23200 | (1, 0, 0) | 19200 | (400, 800, 1200) |
| 32 | 3 | 1 | 1 | 0 | 0 | 20800 | (1, 0, 0, 0) | 16400 | (400, 800, 1200) |
| 32 | 1 | 2 | 1 | 0 | 0 | 28000 | (1, 0) | 24400 | (400, 800, 1200) |
| 32 | 1 | 2 | 2 | 0 | 0 | 28000 | (3, 2) | 24400 | (50, 100, 200) |
| 32 | 1 | 2 | 2 | 0 | 1 | 26000 | (41, 24) | 26000 | (0, 0, 0) |
| 32 | 1 | 2 | 1 | 1 | 0 | 28000 | (3, 2) | 24400 | (50, 100, 200) |
| 32 | 2 | 2 | 1 | 0 | 0 | 26600 | (1, 0, 0) | 25200 | (400, 800, 1200) |
| 32 | 2 | 2 | 2 | 0 | 0 | 26600 | (3, 2, 2) | 25200 | (50, 100, 200) |
| 32 | 2 | 2 | 1 | 0 | 1 | 16400 | (1, 0, 0) | 16400 | (0, 0, 0) |
| 32 | 2 | 2 | 1 | 1 | 0 | 26600 | (3, 2, 2) | 25200 | (50, 100, 200) |
| 32 | 3 | 2 | 1 | 0 | 0 | 20800 | (1, 0, 0, 0) | 16400 | (400, 800, 1200) |
| 32 | 1 | 3 | 1 | 0 | 0 | 26000 | (1, 0) | 23200 | (400, 800, 1200) |
| 32 | 2 | 3 | 1 | 0 | 0 | 26400 | (1, 0, 0) | 23200 | (400, 800, 1200) |
| 48 | 1 | 1 | 2 | 0 | 0 | 44000 | (3, 2) | 40000 | (100, 200, 400) |
| 48 | 2 | 1 | 2 | 0 | 0 | 40000 | (3, 2, 2) | 36000 | (100, 200, 400) |
| 48 | 3 | 1 | 2 | 0 | 0 | 39600 | (3, 2, 2, 2) | 34200 | (100, 200, 300) |
| 48 | 1 | 2 | 2 | 0 | 0 | 44000 | (3, 2) | 40000 | (100, 200, 400) |
| 48 | 1 | 2 | 2 | 0 | 1 | 40800 | (61, 41) | 40800 | (0, 0, 0) |
| 48 | 2 | 2 | 2 | 0 | 0 | 40000 | (3, 2, 2) | 36000 | (100, 200, 400) |
| 48 | 2 | 2 | 2 | 0 | 1 | 35600 | (41, 24, 24) | 35600 | (0, 0, 0) |
| 48 | 3 | 2 | 1 | 0 | 0 | 34000 | (1, 0, 0, 0) | 30000 | (600, 1000, 1600) |
| 48 | 3 | 2 | 1 | 0 | 1 | 24400 | (1, 0, 0, 0) | 24400 | (0, 0, 0) |
| 48 | 1 | 3 | 1 | 0 | 0 | 44000 | (1, 0) | 40000 | (600, 1000, 1600) |
| 48 | 1 | 3 | 2 | 0 | 0 | 44000 | (3, 2) | 40000 | (100, 200, 400) |
| 48 | 1 | 3 | 1 | 1 | 0 | 44000 | (3, 2) | 40000 | (100, 200, 400) |
| 48 | 2 | 3 | 1 | 0 | 0 | 39200 | (1, 0, 0) | 35200 | (600, 1000, 1600) |
| 48 | 3 | 3 | 1 | 0 | 0 | 34000 | (1, 0, 0, 0) | 30000 | (600, 1000, 1600) |
| 64 | 1 | 1 | 2 | 0 | 0 | 60000 | (3, 2) | 56000 | (100, 200, 400) |
| 64 | 2 | 1 | 2 | 0 | 0 | 57400 | (3, 2, 2) | 52500 | (100, 200, 400) |
| 64 | 3 | 1 | 2 | 0 | 0 | 52000 | (3, 2, 2, 2) | 45000 | (100, 200, 300) |
| 64 | 1 | 2 | 2 | 0 | 0 | 60000 | (3, 2) | 56000 | (100, 200, 400) |
| 64 | 1 | 2 | 2 | 0 | 1 | 48800 | (1, 1) | 48800 | (0, 0, 0) |
| 64 | 2 | 2 | 2 | 0 | 0 | 57400 | (3, 2, 2) | 52200 | (100, 200, 400) |
| 64 | 2 | 2 | 2 | 0 | 1 | 50800 | (61, 33, 33) | 50800 | (0, 0, 0) |
| 64 | 3 | 2 | 2 | 0 | 0 | 52000 | (3, 2, 2, 2) | 45000 | (100, 200, 300) |
| 64 | 3 | 2 | 2 | 0 | 1 | 45200 | (41, 24, 24, 24) | 45200 | (0, 0, 0) |
| 64 | 1 | 3 | 2 | 0 | 0 | 60000 | (3, 2) | 56000 | (100, 200, 400) |
| 64 | 2 | 3 | 1 | 0 | 0 | 57400 | (1, 0, 0) | 52500 | (800, 1200, 2000) |
| 64 | 2 | 3 | 2 | 0 | 0 | 57400 | (3, 2, 2) | 52500 | (100, 200, 400) |
| 64 | 2 | 3 | 1 | 1 | 0 | 57400 | (3, 2, 2) | 52500 | (100, 200, 400) |
| 64 | 3 | 3 | 1 | 0 | 0 | 48000 | (1, 0, 0, 0) | 40000 | (800, 1200, 2000) |
| 96 | 1 | 1 | 2 | 0 | 0 | 90000 | (3, 2) | 86000 | (200, 400, 600) |
| 96 | 2 | 1 | 2 | 0 | 0 | 86000 | (3, 2, 2) | 78000 | (200, 300, 400) |
| 96 | 3 | 1 | 2 | 0 | 0 | 84000 | (3, 2, 2, 2) | 76000 | (100, 200, 300) |
| 96 | 1 | 2 | 2 | 0 | 0 | 90000 | (3, 2) | 86000 | (200, 400, 600) |
| 96 | 1 | 2 | 2 | 0 | 1 | 88000 | (6, 5) | 88000 | (0, 0, 0) |
| 96 | 2 | 2 | 2 | 0 | 0 | 86000 | (3, 2, 2) | 78000 | (200, 300, 400) |
| 96 | 2 | 2 | 2 | 0 | 1 | 80800 | (80, 61, 61) | 80800 | (0, 0, 0) |
| 96 | 3 | 2 | 2 | 0 | 0 | 84000 | (3, 2, 2, 2) | 76000 | (100, 200, 300) |
| 96 | 3 | 2 | 2 | 0 | 1 | 81200 | (80, 41, 41, 41) | 81200 | (0, 0, 0) |
| 96 | 1 | 3 | 2 | 0 | 0 | 90000 | (3, 2) | 86000 | (200, 400, 600) |
| 96 | 2 | 3 | 2 | 0 | 0 | 86000 | (3, 2, 2) | 78000 | (200, 300, 400) |
| 96 | 3 | 3 | 1 | 0 | 0 | 84000 | (1, 0, 0, 0) | 76000 | (1000, 2000, 3000) |
| 96 | 3 | 3 | 2 | 0 | 0 | 84000 | (3, 2, 2, 2) | 76000 | (100, 200, 300) |
| 96 | 3 | 3 | 1 | 1 | 0 | 84000 | (3, 2, 2, 2) | 76000 | (100, 200, 300) |
| 128 | 1 | 1 | 2 | 0 | 0 | 122000 | (3, 2) | 118000 | (200, 400, 600) |
| 128 | 2 | 1 | 2 | 0 | 0 | 118000 | (3, 2, 2) | 110000 | (200, 300, 400) |
| 128 | 3 | 1 | 2 | 0 | 0 | 116000 | (3, 2, 2, 2) | 108000 | (100, 200, 300) |
| 128 | 1 | 2 | 2 | 0 | 0 | 122000 | (3, 2) | 118000 | (200, 400, 600) |
| 128 | 2 | 2 | 2 | 0 | 0 | 118000 | (3, 2, 2) | 110000 | (200, 300, 400) |
| 128 | 3 | 2 | 2 | 0 | 0 | 116000 | (3, 2, 2, 2) | 108000 | (100, 200, 300) |
| 128 | 1 | 3 | 2 | 0 | 0 | 122000 | (3, 2) | 118000 | (200, 400, 600) |
| 128 | 2 | 3 | 2 | 0 | 0 | 118000 | (3, 2, 2) | 110000 | (200, 300, 400) |
| 128 | 3 | 3 | 2 | 0 | 0 | 116000 | (3, 2, 2, 2) | 108000 | (100, 200, 300) |
| 256 | 1 | 1 | 2 | 0 | 0 | 248000 | (3, 2) | 244000 | (400, 800, 1000) |
| 256 | 2 | 1 | 2 | 0 | 0 | 244000 | (3, 2, 2) | 236000 | (300, 500, 800) |
| 256 | 3 | 1 | 2 | 0 | 0 | 240000 | (3, 2, 2, 2) | 232000 | (300, 400, 600) |
| 256 | 1 | 2 | 2 | 0 | 0 | 248000 | (3, 2) | 244000 | (400, 800, 1000) |
| 256 | 2 | 2 | 2 | 0 | 0 | 244000 | (3, 2, 2) | 236000 | (300, 500, 800) |
| 256 | 3 | 2 | 2 | 0 | 0 | 240000 | (3, 2, 2, 2) | 232000 | (300, 400, 600) |

-continued

| IVAS Operating bitrate | Input format | BW | Spatial Audio Coding Mode | Transition Mode | Mono Downmix Backward Compatibility Mode | EVS Target Bitrate | BR RATIO | EVS Minimum Bitrate | EVS BR deviation steps (bps) |
|---|---|---|---|---|---|---|---|---|---|
| 256 | 1 | 3 | 2 | 0 | 0 | 248000 | (3, 2) | 244000 | (400, 800, 1000) |
| 256 | 2 | 3 | 2 | 0 | 0 | 244000 | (3, 2, 2) | 236000 | (300, 500, 800) |
| 256 | 3 | 3 | 2 | 0 | 0 | 240000 | (3, 2, 2, 2) | 232000 | (300, 400, 600) |

Example Decoding of IVAS Bitstreams

In an embodiment, the steps to decode an IVAS bitstream are as follows:

Step 1: compute the IVAS operating bitrate based on the length of the bitstream and the stride_secs.

Step 2: read the fixed length CH section indicating the spatial coding tool.

Step 3: based on the IVAS operating bitrate determine the length of CTH field by checking the number of entries of the IVAS operating bitrate (calculated in Step 1)) in the IVAS bitrate distribution control table.

Step 3: read the index offset in the CTH field once the length of CTH field is known.

Step 5: determine the actual IVAS bitrate distribution control table index using the index offset and the IVAS operating bitrate.

Step 6: read all the information about EVS bitrate distribution and mono downmix backward compatibility from the indexed table entry.

Step 7: if mono downmix backward compatibility mode is ON, then pass the remaining IVAS bits to EVS decoder first, calculate the bit length for each EVS instance based on the EVS bitrate distribution, read EVS bits for each EVS instance, decode the EVS bits with the corresponding EVS decoder and decode the spatial metadata in the MDP section.

Step 8: if mono downmix backward compatibility mode is OFF, decode the spatial metadata in the MDP section, calculate the bit length for each EVS instance based on the EVS bitrate distribution and read and decode the EVS bits for each EVS instance from the EP section of the IVAS bitstream.

Step 9: use the decoded EVS output and spatial metadata to construct the input audio format, such as stereo (CACPL) or FoA (SPAR).

An advantage of the IVAS bitstream format embodiment described above is that it efficiently and compactly encodes data that supports a range of audio service capabilities, including but not limited to mono to stereo upmixing and fully immersive audio encoding, decoding and rendering. It also supports by a wide range of devices, endpoints, and network nodes, including but not limited to: mobile and smart phones, electronic tablets, personal computers, conference phones, conference rooms, virtual reality (VR) and augmented reality (AR) devices, home theatre devices, and other suitable devices, each of which can have various acoustic interfaces for sound capture and rendering. The IVAS bitstream format is extensible so that it can readily evolve with the IVAS standard and technology.

Example IVAS SPAR Encoding/Decoding

The following description of a further embodiment will focus on the differences between it and the previously described embodiment. Therefore, features which are common to both embodiments may be omitted from the following description, and if so it should be assumed that features of the previously described embodiments are or at least can be implemented in the further embodiment, unless the following description thereof requires otherwise. Additionally, when a feature is taken from the implementation disclosed below and added to a claim, the feature may not be related or inextricably linked to the other features of the implementation.

In some implementations, an IVAS SPAR encoder determines and encodes a coding mode/tool indicator in a common header (CH) section of an IVAS bitstream. The coding mode/tool indicator has values corresponding to coding modes/tools. The IVAS bitstream determines and encodes a mode header/tool header in a tool header (TH) section of the IVAS bitstream, where the TH section follows the CH section. The IVAS SPAR encoder determines and encodes a metadata payload in a metadata payload (MDP) section of the IVAS bitstream, where the MDP section follows the CH section. The IVAS SPAR encoder determines and encodes an enhanced voice services (EVS) payload in an EVS payload (EP) section of the IVAS bitstream, where the EP section follows the CH section. In some implementations, the IVAS system stores the bitstream on a non-transitory, computer-readable medium. In other implementations, the IVAS system streams the bitstream to a downstream device. In some implementations, the IVAS SPAR encoder includes the device architecture described in reference to FIG. 8.

In some implementations, the EP section follows the MDP section. Note that having the EP section follow the MDP section of the IVAS bitstream ensures efficient bit-packing, and allowing the number of MDP bits and EP bits to vary (as per the bitrate distribution algorithm), ensures that all the available bits in the IVAS bitrate budget are utilized.

In some implementations, an IVAS SPAR decoder extracts and decodes an IVAS bitstream encoded in an IVAS SPAR format. The IVAS SPAR decoder extracts and decodes the coding mode/tool indicator in the CH section of a bitstream. The coding mode/tool indicator has values corresponding to coding modes/tools. The IVAS SPAR decoder extracts and decodes the mode header/tool header in the tool header (TH) section of the bitstream. The TH section follows the CH section. The IVAS SPAR decoder extracts and decodes the metadata payload in the MDP section of the bitstream. The MDP section follows the CH section. The IVAS SPAR decoder decodes an EVS payload in an EP section of the bitstream. The EP section follows the CH section.

In some implementations, the IVAS system controls an audio decoder based on the coding mode, the tool header, the EVS payload, and the metadata payload. In other implementations the IVAS system stores a representation of the coding mode, the tool header, the EVS payload, and the metadata payload on a non-transitory, computer-readable medium. In some implementations, the IVAS SPAR decoder includes the device architecture described in reference to FIG. 8.

In some implementations, the CH includes a three-bit data structure, where one of the values of the three-bit data structure corresponds to a SPAR coding mode, and the rest of the values correspond to other coding modes. The three-bit data structure is advantageous because it allows for a compact code that can indicate up to 8 coding modes. In other implementations, the CH includes fewer than 3 bits. In other implementations, the CH includes more than 3 bits.

In some implementations, the IVAS system stores in or reads from the TH section of the IVAS bitstream a row index pointing to a row in a SPAR bitrate distribution control table. For example, the row index can be computed based on the number of rows corresponding to the IVAS operating bitrate as follows: x=ceil(log 2(number of rows corresponding to the IVAS bitrate)). Therefore, the length of the TH section is variable.

In some implementations, the system stores in or reads from the MDP section of the IVAS bitstream: a quantization strategy indicator; a coding strategy indicator; and quantized and encoded real and imaginary parts of one or more coefficients.

In other implementations, the system stores in or reads from the MDP section of the IVAS bitstream a quantization strategy indicator.

In other implementations, the system stores in or reads from the MDP section of the IVAS bitstream a coding strategy indicator.

In other implementations, the system stores in or reads from the MDP section of the IVAS bitstream quantized and encoded real and imaginary parts of one or more coefficients.

In some implementations, the one or more coefficients include but are not limited to: prediction coefficients, cross prediction coefficients (or direct coefficients), real (diagonal) decorrelator coefficients and complex (off diagonal) decorrelator coefficients.

In some implementations, more or fewer coefficients are stored in and read from the MDP section of the IVAS bitstream.

In some implementations, the IVAS system stores in or reads from the EP section of the IVAS bitstream, the EVS payload for all channels as per 3GPP TS 26.445.

An example IVAS bitstream with SPAR formatting is illustrated below. The IVAS bitstream includes 4 subdivisions as follows.

Common Header (CH)
Tool Header (TH)
Metadata Payload (MDP)
EVS Payload (EP)

Common Header (CH):

In some implementations, the IVAS common header (CH) is formatted as follows.

| Number of Bits | Description | Values |
| --- | --- | --- |
| 3 | This field is a coding mode/tool indicator that specifies an IVAS coding mode/coding tool | 2-SPAR FoA 0, 1, 3, 4, 5, 6, 7- otherwise |

Tool Header (TH):

In some implementations, the SPAR tool header (TH) is an index offset to a SPAR bitrate distribution control table.

| Number of Bits | Description | Values |
| --- | --- | --- |
| x | Row index to a SPAR bitrate distribution table. Length of this field is variable. x = ceil(log2(number of rows corresponding to the IVAS bitrate being used)) | |

An example implementation of a SPAR bitrate distribution control table is shown below. Each IVAS bitrate can support one or more values of Bandwidth (BW), downmix configuration (dmx ch, dmx string), active W, complex flag, transition mode values, EVS bitrate set, metadata quantization levels set and decorrelator ducking flag. In this example implementation, because there is only one entry per bitrate, the number of bits for the SPAR TH section is 0. The acronyms used in the table below are defined as follows:

PR: Prediction coefficients,

C: Cross prediction coefficients (or direct coefficients),

P_r: Real (diagonal) decorrelator coefficients,

P_c: Complex (off diagonal) decorrelator coefficients.

An example SPAR bitrate distribution control table is as follows.

| IVAS Bitrate | BW | dmx ch | dmx String | Active W | Complex Flag | dmx switch transition mode (placeholder) | EVS (Target, min, max) BR (bps) | Metadata Quantization Levels Target/Fallback1/Fallback2 | Decorrelator Ducking |
| --- | --- | --- | --- | --- | --- | --- | --- | --- | --- |
| 32000 | 3 | 1 | WYXZ | 1 | 0 | 0 | W - 24000, 20450, 31950 | PR = 21,15, 15<br>P_r = 5, 5, 3<br>P_c = 1, 1, 1 | 0 |
| 64000 | 3 | 2 | WYXZ | 0 | 0 | 0 | W - 38000, 34050, 56000;<br>Y' - 16000, 14850, 20400 | PR = 15, 15, 15<br>C = 9, 7, 7<br>P_r = 9, 7, 7<br>P_c = 5, 3, 1 | 1 |
| 96000 | 3 | 3 | WYXZ | 0 | 0 | 0 | W - 47000, 44000, 56000;<br>Y' - 23000, 20450, 31950;<br>X' - 16000, 14850, 20400 | PR = 15, 15, 15<br>C = 9, 7, 7<br>P_r = 9, 7, 7 | 1 |
| 160000 | 3 | 3 | WYXZ | 0 | 0 | 0 | W - 74000, 69000, 112000;<br>Y' - 41000, 40050, 56000;<br>X'- 35000, 34050, 56000 | PR = 31, 31, 31<br>C = 9, 7, 7<br>P_r = 9, 7, 7 | 1 |

-continued

| IVAS Bitrate | BW | dmx ch | dmx String | Active W | Complex Flag | dmx switch transition mode (placeholder) | EVS (Target, min, max) BR (bps) | Metadata Quantization Levels Target/Fallback1/Fallback2 | Decorrelator Ducking |
|---|---|---|---|---|---|---|---|---|---|
| 256000 | 3 | 4 | WYXZ | 0 | 0 | 0 | W - 91900, 87000, 112000; Y' - 68050, 68050, 112000; X' - 52000, 48000, 56000; Z' - 34050, 34050, 56000 | PR = 31, 31, 31 PR = 63, 63, 63 | 1 |

Metadata Payload (MDP):

An example metadata payload (MDP) is as follows.

| Number of Bits | Description | Values |
|---|---|---|
| x | x bits to indicate quantization strategy (quantization strategy index) x = ceil(log2(number of quant strategy)) | All quantization strategies are per bitrate from fine to coarse or extra course quantization |
| 3 | 3 Bits to indicate the coding strategy used to code the quantized metadata. | 0-12 band spatial metadata, Non differential entropy coded 1-6 band spatial metadata, non-differential entropy coded 2-12 band spatial metadata, Non differential base2 coding 3-6 band spatial metadata, non-differential base2 coding 4-12 band spatial metadata, time differential scheme 1 entropy coded 5-12 band spatial metadata, time differential scheme 2 entropy coded 6-12 band spatial metadata, time differential scheme 3 entropy coded 7-12 band spatial metadata, time differential scheme 4 entropy coded |
| prediction coefficients (PR) bits | Prediction coefficients bits-variable bit length based on entropy coding | |
| C coefficients bits | direct coefficients bits-variable bit length based on downmix configuration and entropy coding | |
| P_r coefficients bits | diagonal real P coefficients bits-variable bit length based on downmix configuration and entropy coding | |
| P_c coefficients bits | lower triangle complex P coefficients bits-variable bit length based on downmix configuration and entropy coding | |

EVS Payload (EP):

In some implementations, the metadata quantization and calculation of actual EVS bitrates for each downmix channel is performed using an EVS bitrate distribution control strategy. An example implementation of an EVS bitrate distribution control strategy is described below.

Example EVS Bitrate Distribution Control Strategy

In some implementations, an EVS bitrate distribution control strategy includes two sections: metadata quantization and EVS bitrate distribution.

Metadata Quantization. There are two defined thresholds in this section: a target parameter bit rate threshold (MDtar) and a maximum target bit rate threshold (MDmax).

Step 1: For every frame, the parameters are quantized in a non-time differential manner and coded with an entropy coder. In some implementations, an Arithmetic coder is used. In other implementations, a Huffman encoder is used. If the parameter bit rate estimate is below MDtar, any extra available bits are supplied to the audio encoder to increase the bitrate of the audio essence.

Step 2: If Step 1 fails, a subset of parameter values in the frame is quantized and subtracted from the quantized parameter values in a previous frame and the differential quantized parameter value is coded with the entropy coder. If the parameter bitrate estimate is below MDtar, any extra available bits are supplied to the audio encoder to increase the bitrate of the audio essence.

Step 3: If Step 2 fails, then the bit rate of quantized parameters is calculated with no entropy.

Step 4: The results of Step 1, Step 2, and Step 3 are compared to MDmax. If the minimum of Step 1, Step 2, and Step 3 is within the MDmax, the remaining bits are encoded and provided to the audio coder.

Step 5: If Step 4 fails, then the parameters are quantized more coarsely and the above steps are repeated as a first fallback strategy (Fallback1).

Step 6: If Step 5 fails, then the parameters are quantized with a quantization scheme that is guaranteed to fit within the MDmax, as a second fallback strategy (Fallback2). After all the iterations mentioned above it is guaranteed that the metadata bitrate will fit within MDmax, and the encoder will generate actual metadata bits or Metadata_actual_bits (MDact).

EVS Bitrate Distribution (EVSbd). For this section, the following definitions apply.

EVStar: EVS target bits, desired bits for each EVS instance.

EVS act: EVS actual bits, sum of actual bits available for all the EVS instances.

EVSmin: EVS minimum bits, minimum bits for each EVS instance. EVS bitrate should never go below the values indicated by these bits.

EVSmax: EVS maximum bits, maximum bits for each EVS instance. EVS bitrate should never go above the values indicated by these bits.

EVS W: EVS instance to encode W channel.
EVS Y: EVS instance to encode Y channel
EVS X: EVS instance to encode X channel
EVS Z: EVS instance to encode Z channel.
EVS act=IVAS_bits−header bits−MDact If EVSact is less than sum of EVStar for all EVS instances then bits are taken from EVS instances in the following order (Z, X, Y, W). The maximum bits that can be taken from any channel=EVStar(ch)−EVSmin(ch).

If EVSact is greater than sum of EVStar for all EVS instances then all the additional bits are assigned to the downmix channels in the following order (W, Y, X, Z). The maximum additional bits that can be added to any channel=EVSmax(ch)−EVStar(ch).

The EVSbd scheme described above computes actual EVS bitrates for all channels: EWa, EYa, EXa, EZa for W, Y, X and Z channel respectively. After each channel is encoded by separate EVS instances with EWa, EYa, EXa and EZa bitrates, all the EVS bits are concatenated and packed together. An advantage of this configuration is that no additional header is required to indicate EVS bitrate for any channel.

In some implementations, the EP section is as follows.

| Number of Bits | Description | Values |
|---|---|---|
| EWa | EVS coded bits for W channel as per 3 GPP TS 26.445 | |
| EYa | EVS coded bits for Y' channel as per 3 GPP TS 26.445 | |
| EXa | EVS coded bits for X' channel as per 3 GPP TS 26.445 | |
| EZa | EVS coded bits for Z' channel as per 3 GPP TS 26.445 | |

Example SPAR Decoder Bitstream Unpacking

In some implementations, the steps of SPAR decoder bitstream unpacking are described as follows:

Step 1: determine the IVAS bitrate from a length of the received bit buffer.

Step 2: parse the SPAR TH section based on the number of entries for the IVAS bitrate in the SPAR bitrate distribution control table to extract an index offset, where the index offset is determined by the IVAS operating bitrate.

Step 3: determine an actual table row index for the SPAR bitrate distribution control table using the index offset, and read all the columns of the SPAR bitrate distribution control table row that is pointed to by the actual table row index.

Step 4: read the quantization strategy and coding strategy bits from the MDP section of the IVAS bitstream, and unquantize the SPAR spatial metadata in the MPD section based on the indicated quantization strategy and coding strategy.

Step 5: Based on total EVS bitrate (remaining bits to be read from IVAS bitstream), determine an actual EVS bitrate for each channel per the EVS bitrate distribution (EVSbd) described above.

Step 6: read the coded EVS bits from the EP section of the IVAS bitstream based on the actual EVS bitrate and decode each channel of the FoA audio signal with a respective EVS instance.

Step 7: use the decoded EVS output and spatial metadata to construct the FoA (SPAR) audio signal.

An advantage of the IVAS bitstream format embodiment described above is that it efficiently and compactly encodes data that supports a range of audio service capabilities, including but not limited to mono to stereo upmixing and fully immersive audio encoding, decoding and rendering (e.g., FoA encoding). It also supports by a wide range of devices, endpoints, and network nodes, including but not limited to: mobile and smart phones, electronic tablets, personal computers, conference phones, conference rooms, virtual reality (VR) and augmented reality (AR) devices, home theatre devices, and other suitable devices, each of which can have various acoustic interfaces for sound capture and rendering. The IVAS bitstream format is extensible so that it can readily evolve with the IVAS standard and technology.

Example Processes—IVAS Bitstreams In CACPL Format

Figure 4A:
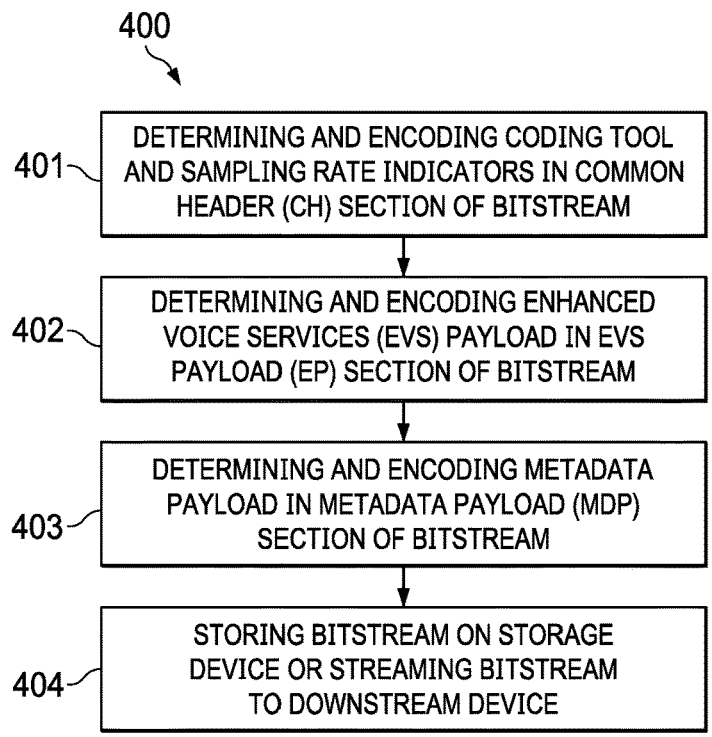
FIG. 4A is a flow diagram of an IVAS encoding process, according to an embodiment.

FIG. 4A is a flow diagram of a IVAS encoding process 400, according to an embodiment. Process 400 can be implemented using the device architecture as described in reference to FIG. 8.

Process 400 includes determining a coding tool indicator and sampling rate indicator and encoding, using an IVAS encoder, the coding tool indicator and the sampling rate indicator in a common header (CH) section of an IVAS bitstream (401). In some implementations, the tool indicator has values corresponding to coding tools and the sampling rate indicator has values indicating a sampling rate.

Process 400 further includes determining an enhanced voice services (EVS) payload and encoding, using the IVAS encoder, the enhanced voice services (EVS) payload in an EVS payload (EP) section of the IVAS bitstream (402). In some implementations, the EP section follows the CH section.

Process 400 further includes determining a metadata payload in metadata payload and encoding, using the IVAS encoder, the metadata payload in metadata payload (MDP) section of the IVAS bitstream (403). In some implementations, the MDP section follows the CH section. In some implementations, the EP section follows the MDP section of the bitstream.

Process 400 further includes storing the IVAS bitstream on a non-transitory computer-readable medium or streaming the IVAS bitstream to a downstream device (404).

Figure 4B:
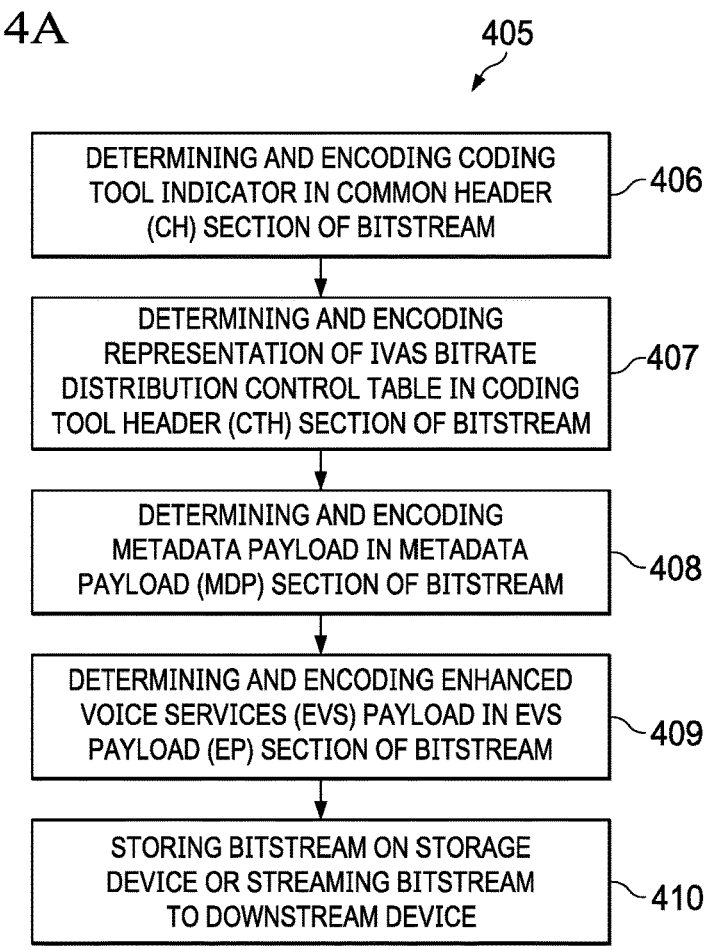
FIG. 4B is a flow diagram of an IVAS encoding process using an alternative IVAS format according to an embodiment.

FIG. 4B is a flow diagram of a IVAS encoding process 405 using an alternative IVAS format, according to an embodiment. Process 405 can include the device architecture as described in reference to FIG. 8.

Process 405 includes determining a coding tool indicator and encoding, using an IVAS encoder, the coding tool indicator in a common header (CH) section of an IVAS bitstream (406). In some implementations, the tool indicator has values corresponding to coding tools.

Process 405 further includes encoding, using the IVAS encoder, a representation of an IVAS bitrate distribution control table in a common spatial coding tool header (CTH) section of the IVAS bitstream (407).

Process 405 further includes determining a metadata payload and encoding, using the IVAS encoder, the metadata payload in metadata payload (MDP) section of the IVAS bitstream (408). In some implementations, the MDP section follows the CH section of the IVAS bitstream.

Process 405 further includes determining an enhanced voice services (EVS) payload and encoding, using the IVAS encoder, the enhanced voice services (EVS) payload in an EVS payload (EP) section of the IVAS bitstream (409). In some implementations, the EP section follows the CH section of the IVAS bitstream. In some implementations, the MDP section follows the EP section of the IVAS bitstream.

Process 405 further includes storing the IVAS bitstream on a storage device or streaming the IVAS bitstream to a downstream device (410).

Figure 5A:
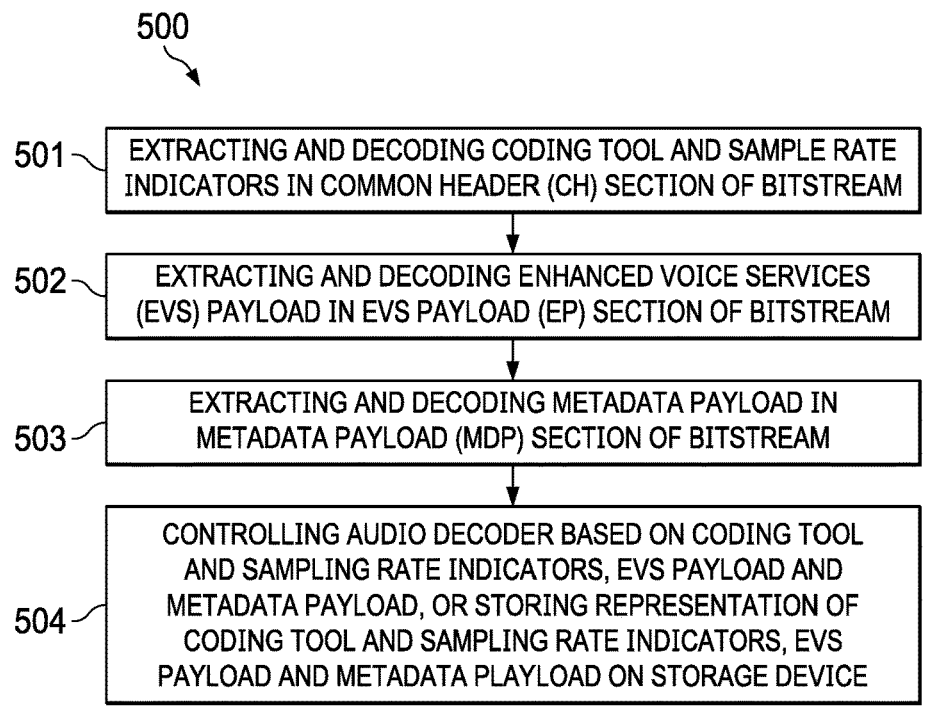
FIG. 5A is a flow diagram of an IVAS decoding process, according to an embodiment.

FIG. 5A is a flow diagram of an IVAS decoding process 500, according to an embodiment. Process 500 can be implemented using the device architecture as described in reference to FIG. 8.

Process 500 includes extracting and decoding, using an IVAS decoder, a coding tool indicator and sampling rate indicator from a common header (CH) section of an IVAS bitstream (501). In some implementations, the tool indicator has values corresponding to coding tools and the sampling rate indicator has values indicating a sampling rate.

Process 500 further includes extracting and decoding, using the IVAS decoder, an enhanced voice services (EVS) payload from an EVS payload (EP) section of the IVAS bitstream (502). In some implementations, the EP section follows the CH section of the IVAS bitstream.

Process 500 further includes extracting and decoding, using the IVAS decoder, a metadata payload from metadata payload (MDP) section of the bitstream (503). In some implementations, the MDP section follows the CH section of the IVAS bitstream. In some implementations, the EP section follows the MDP section of the IVAS bitstream.

Process 500 further includes controlling an audio decoder based on the coding tool, the sampling rate, the EVS payload, and the metadata payload, or storing a representation of the coding tool, the sampling rate, the EVS payload, and the metadata payload on a non-transitory computer-readable medium (504).

Figure 5B:
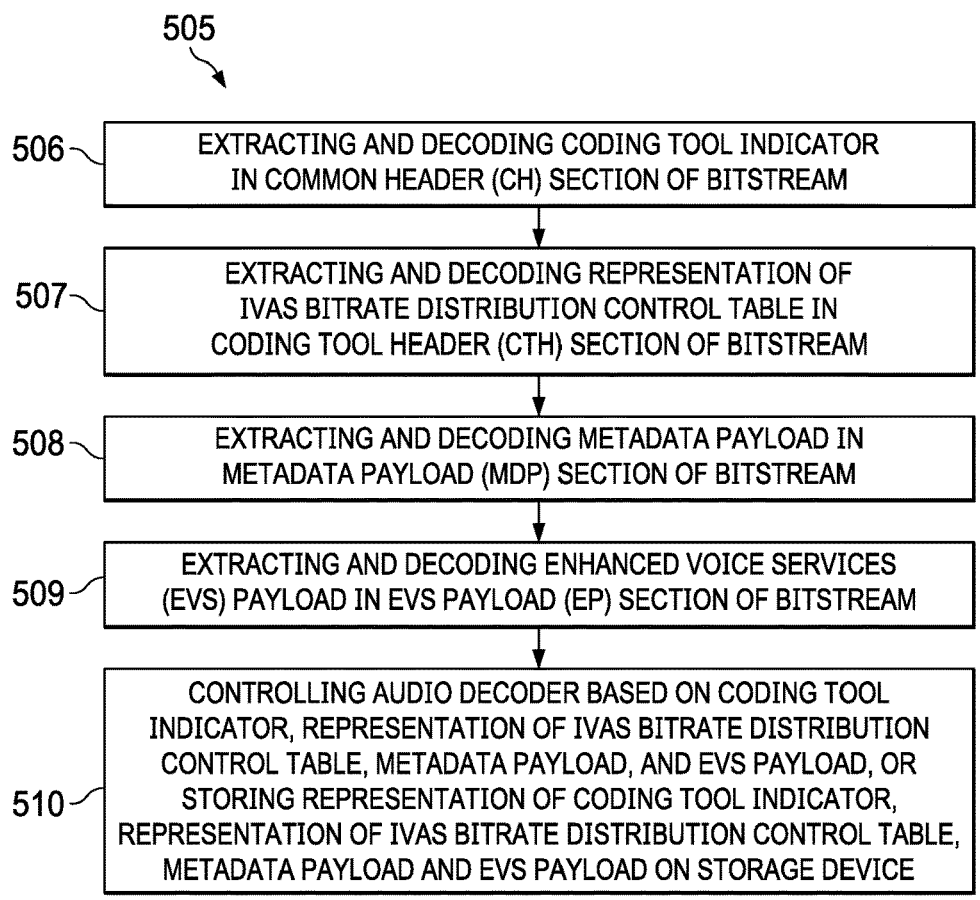
FIG. 5B is a flow diagram of an IVAS decoding process using an alternative IVAS format, according to an embodiment.

FIG. 5B is a flow diagram of an IVAS decoding process 505 using an alternative format, according to an embodiment. Process 505 can be implemented using the device architecture as described in reference to FIG. 8.

Process 505 includes extracting and decoding, using an IVAS decoder, a coding tool indicator in a common header (CH) section of an IVAS bitstream (506). In some implementations, the tool indicator has values corresponding to coding tools.

Process 505 further includes extracting and decoding, using the IVAS decoder, a representation of an IVAS bitrate distribution control table in a common spatial coding tool header (CTH) section of the IVAS bitstream (507).

Process 505 further includes decoding, using the IVAS decoder, a metadata payload in metadata payload (MDP) section of the IVAS bitstream (508). In some implementations, the MDP section follows the CH section of the IVAS bitstream.

Process 505 further includes decoding, using the IVAS decoder, an enhanced voice services (EVS) payload in an EVS payload (EP) section of the IVAS bitstream (509). In some implementations, the EP section follows the CH section of the IVAS bitstream. In some implementations, the MDP section follows the EP section of the IVAS bitstream.

Process 505 further includes controlling an audio decoder based on the coding tool indicator, the representation of the IVAS bitrate distribution control table, the metadata payload, and the EVS payload, or storing a representation of the coding tool indicator, the representation of the IVAS bitrate distribution control table, the metadata payload, and the EVS payload on a storage device (510).

Example Processes—IVAS Bitstreams In SPAR Format

FIG. 6 is a flow diagram of an IVAS SPAR encoding process 600, according to an embodiment. Process 600 can be implemented using the device architecture as described in reference to FIG. 8.

Process 600 includes decoding a coding mode/coding tool indicator and encoding, using an IVAS encoder, the coding mode/coding tool indicator in a common header (CH) section of an IVAS bitstream (601).

Process 600 further includes determining and encoding, using the IVAS encoder, a representation of a SPAR bitrate distribution control table in a mode header/tool header in a tool header (TH) section of the IVAS bitstream (602), where the TH section follows the CH section.

Process 600 further includes determining a metadata payload and encoding, using the IVAS encoder, the metadata payload in metadata payload (MDP) section of the IVAS bitstream (603). In some implementations, the MDP section follows the CH section of the IVAS bitstream.

In some implementations, the MDP section includes: a quantization strategy indicator; a coding strategy indicator; and quantized and encoded real and imaginary parts of one or more coefficients. In some implementations, the one or more coefficients include but are not limited to: prediction coefficients, cross prediction coefficients (or direct coefficients), real (diagonal) decorrelator coefficients and complex (off diagonal) decorrelator coefficients. In some implementations, more or fewer coefficients are stored in and read from the MDP section of the IVAS bitstream.

Process 600 further includes determining an enhanced voice services (EVS) payload and encoding, using the IVAS encoder, the EVS payload in an EVS payload (EP) section of the IVAS bitstream (604). In some implementations, the EP section of the IVAS bitstream includes the EVS payload for all channels as per 3GPP TS 26.445. In some implementations, the EP section follows the CH section of the IVAS bitstream. In some implementations, the EP section follows the MDP section. Note that having the EP section follow the MDP section of the IVAS bitstream ensures efficient bit-packing, and allowing the number of MDP bits and EP bits to vary (as per the bitrate distribution algorithm), ensures that all the available bits in the IVAS bitrate budget are utilized.

Process 600 further includes storing the bitstream on a non-transitory computer-readable medium, or streaming the bitstream to a downstream device (605).

FIG. 7 is a flow diagram of an IVAS SPAR decoding process 700, according to an embodiment. Process 700 can be implemented using the device architecture as described in reference to FIG. 8.

Process 700 includes extracting and decoding, using a IVAS decoder, a coding mode indicator in the common header (CH) section of an IVAS bitstream (701).

Process 700 includes extracting and decoding, using the IVAS decoder, a representation of a SPAR bitrate distribution control table in a mode header/tool header in a tool header (TH) section of the IVAS bitstream (702). In some implementations, the TH section follows the CH section.

Process 700 further includes extracting and decoding, using the IVAS decoder, a metadata payload from a metadata payload (MDP) section of the IVAS bitstream (703). In some implementations, the MDP section follows the CH section of the IVAS bitstream.

Process 700 further includes extracting and decoding, using the IVAS decoder, an enhanced voice services (EVS) payload from an EVS payload (EP) section of the IVAS bitstream (704). In some implementations, the EP section follows the CH section. In some implementations, the EP section follows the MDP section. Note that having the EP section follow the MDP section of the IVAS bitstream ensures efficient bitpacking, and allowing the number of MDP bits and EP bits to vary (as per the bitrate distribution algorithm), ensures that all the available bits in the IVAS bitrate budget are utilized.

Process 700 further includes controlling an audio decoder based on the coding mode indicator, the representation of the SPAR bitrate distribution control table, the EVS payload, and the metadata payload, or storing a representation of the coding mode indicator, the representation of the SPAR bitrate distribution control table, the EVS payload, and the metadata payload on a non-transitory computer-readable medium (705).

Example System Architecture

Figure 8:
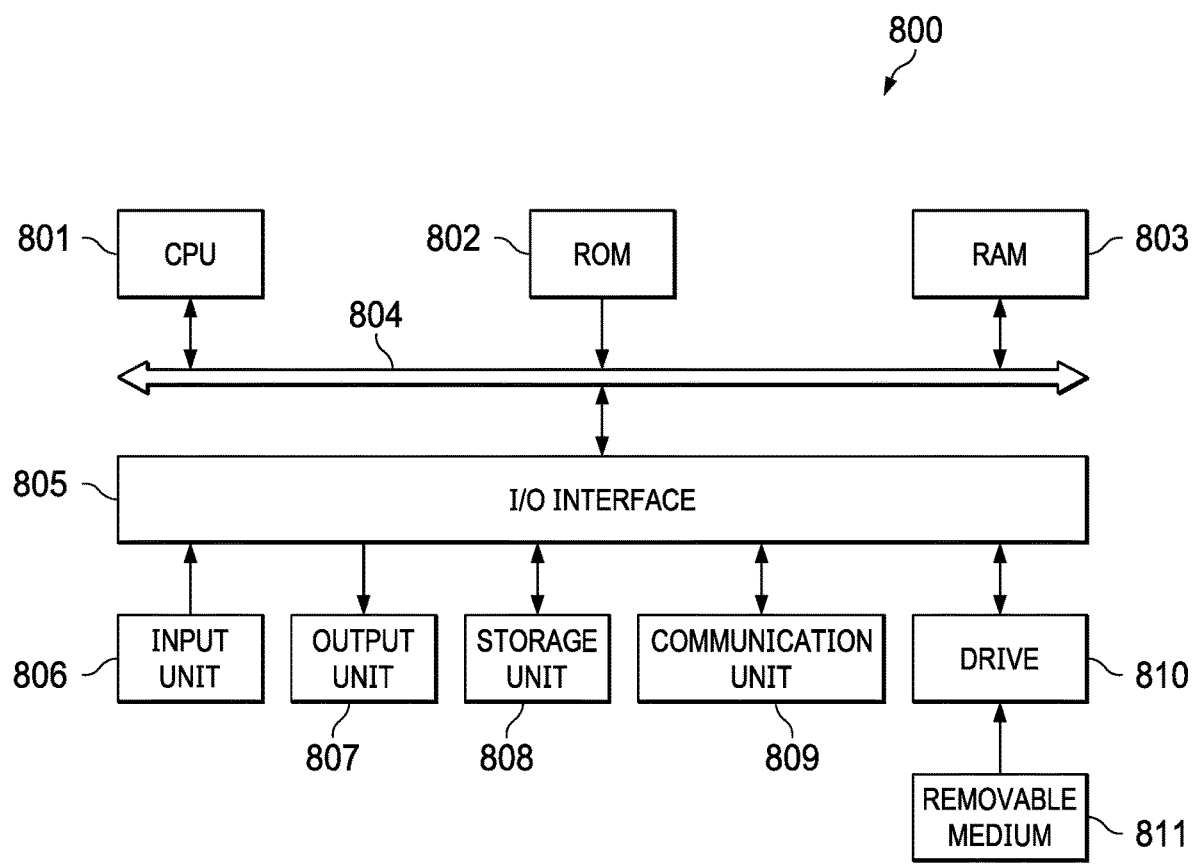
FIG. 8 is a block diagram of an example device architecture, according to an embodiment.

FIG. 8 shows a block diagram of an example system 800 suitable for implementing example embodiments of the present disclosure. System 800 includes one or more server computers or any client device, including but not limited to any of the devices shown in FIG. 1, such as the call server 102, legacy devices 106, user equipment 108, 114, conference room systems 116, 118, home theatre systems, VR gear 122 and immersive content ingest 124. System 800 include any consumer devices, including but not limited to: smart phones, tablet computers, wearable computers, vehicle computers, game consoles, surround systems, kiosks, As shown, the system 800 includes a central processing unit (CPU) 801 which is capable of performing various processes in accordance with a program stored in, for example, a read only memory (ROM) 802 or a program loaded from, for example, a storage unit 808 to a random access memory (RAM) 803. In the RAM 803, the data required when the CPU 801 performs the various processes is also stored, as required. The CPU 801, the ROM 802 and the RAM 803 are connected to one another via a bus 804. An input/output (I/O) interface 805 is also connected to the bus 804.

The following components are connected to the I/O interface 805: an input unit 806, that may include a keyboard, a mouse, or the like; an output unit 807 that may include a display such as a liquid crystal display (LCD) and one or more speakers; the storage unit 808 including a hard disk, or another suitable storage device; and a communication unit 809 including a network interface card such as a network card (e.g., wired or wireless).

In some implementations, the input unit 806 includes one or more microphones in different positions (depending on the host device) enabling capture of audio signals in various formats (e.g., mono, stereo, spatial, immersive, and other suitable formats).

In some implementations, the output unit 807 include systems with various number of speakers. As illustrated in FIG. 1, the output unit 807 (depending on the capabilities of the host device) can render audio signals in various formats (e.g., mono, stereo, immersive, binaural, and other suitable formats).

The communication unit 809 is configured to communicate with other devices (e.g., via a network). A drive 810 is also connected to the I/O interface 805, as required. A removable medium 811, such as a magnetic disk, an optical disk, a magneto-optical disk, a flash drive or another suitable removable medium is mounted on the drive 810, so that a computer program read therefrom is installed into the storage unit 808, as required. A person skilled in the art would understand that although the system 800 is described as including the above-described components, in real applications, it is possible to add, remove, and/or replace some of these components and all these modifications or alteration all fall within the scope of the present disclosure.

Other Implementations

In an embodiment, a method of generating a bitstream for an audio signal, comprises: determining, using an IVAS encoder, a coding tool indicator and a sampling rate indicator, the coding tool indicator having values corresponding to coding tools and the sampling rate indicator having values indicating a sampling rate; encoding, using the IVAS encoder, the coding tool indicator and the sampling rate indicator in a common header (CH) section of an IVAS bitstream; determining, using the IVAS encoder, an enhanced voice services (EVS) payload; encoding, using the IVAS encoder, the EVS payload in an EVS payload (EP) section of the IVAS bitstream, wherein the EP section follows the CH section; determining, using the IVAS encoder, a metadata payload; encoding, using the IVAS encoder, the metadata payload in metadata payload (MDP) section of the IVAS bitstream, where the MDP section follows the CH section; and storing the IVAS bitstream on a non-transitory computer-readable medium or streaming the IVAS bitstream to a downstream device.

In an embodiment, a method of decoding a bitstream of an audio signal, comprises: extracting and decoding, using an IVAS decoder, a coding tool indicator and sampling rate indicator from a CH section of an IVAS bitstream, the tool indicator having values corresponding to coding tools, the sampling rate indicator having values indicating a sampling rate; extracting and decoding, using the IVAS decoder, an EVS payload from an EP section of the bitstream, the EP section following the CH section; decoding, using the IVAS decoder, a metadata payload from a MDP section of the bitstream, the MDP section following the CH section; and controlling an audio decoder based on the coding tool, the sampling rate, the EVS payload, and the metadata payload, or storing a representation of the coding tool, the sampling rate, the EVS payload, and the metadata payload on a non-transitory computer-readable medium.

In an embodiment, the MDP section follows the EP section of the bitstream, or the EP section follows the MDP section of the bitstream.

In an embodiment, the IVAS coding tool indicator is a three-bit data structure, a first value of the three-bit data structure corresponding to a multi mono coding tool, a second value of the three-bit data structure corresponding to a complex advanced coupling (CACPL) coding tool, a third value of the three-bit data structure corresponding to another coding tool.

In an embodiment, the input sampling rate indicator is a two-bit data structure, a first value of the two-bit data structure indicating a 8 kHz sampling rate, a second value of the two-bit data structure indicating a 16 kHz sampling rate, a third value of the two-bit data structure indicating a 32 kHz sampling rate, and a fourth value of the two-bit data structure indicating a 48 kHz sampling rate.

In an embodiment, the preceding methods comprise storing in or reading from, respectively, the EP section of the bitstream: a number of EVS channels indicator; a bitrate (BR) extraction mode indicator; EVS BR data; and EVS payload.

In an embodiment, the preceding methods comprise storing in or reading from, respectively, the MDP section of the data stream: a coding technique indicator; a number of bands indicator; an indicator indicating delay configuration of a filterbank; an indicator of quantization strategy; an entropy coder indicator; a probability model type indicator; a coefficient real part; a coefficient imaginary part; and one or more coefficients.

In an embodiment, a method of generating a bitstream for an audio signal, comprises: determining, using an IVAS encoder, a coding tool indicator, the tool indicator having values corresponding to coding tools; encoding, using the IVAS encoder, the coding tool indicator in a common header (CH) section of an IVAS bitstream; determining, using the IVAS encoder, a representation of an IVAS bitrate distribution control table index; encoding, using the IVAS encoder, the representation of an IVAS bitrate distribution control table index in a common spatial coding tool header (CTH) section of the IVAS bitstream, wherein the CTH section follows the CH section; determining, using the IVAS encoder, a metadata payload; encoding, using the IVAS encoder, the metadata payload in metadata payload (MDP) section of the IVAS bitstream, wherein the MDP section follows the CTH section; determining, using the IVASE encoder, an enhanced voice services (EVS) payload; encoding, using the IVAS encoder, the EVS payload in an EVS payload (EP) section of the IVAS bitstream, wherein the EP section follows the CTH section; and storing the bitstream on a non-transitory computer-readable medium or streaming the bitstream to a downstream device.

In an embodiment, a method of decoding a bitstream of an audio signal, comprises: receiving, by an IVAS decoder, a bitstream; computing an IVAS operating bitrate based on length of the bitstream and stride; reading an indicator of a spatial coding tool from a common header (CH) section of the bitstream; determining a length of a common spatial coding tool header (CTH) section of the bitstream based on the IVAS operating bitrate, the determining including checking number of entries corresponding to the IVAS operating bitrate in an IVAS bitrate distribution control table in the CTH section; reading values in the CTH section upon determining the length of the CTH section to determine an IVAS bitrate distribution control table index; reading information about enhanced voice services (EVS) bitrate distribution from an entry of the IVAS bitrate distribution control table corresponding to the IVAS bitrate distribution control table index; and providing the information about EVS bitrate distribution to an EVS decoder.

In an embodiment, any of the preceding methods comprise reading an indicator for mono downmix backward compatibility with 3GPP TS 26.445 from the entry of the IVAS bitrate distribution control table.

In an embodiment, the preceding comprises: determining that the mono downmix backward compatibility indicator is in an ON mode; and in response to the ON mode: providing remaining portions of the bitstream to the EVS decoder; then calculating a respective bit length for each EVS instance from a remaining portion of the bitstream based on the EVS bitrate distribution; reading EVS bits for each EVS instance based on a corresponding bit length; and providing the EVS bits to the EVS decoder as the first portion; providing remaining portions of the bitstream to an MDP decoder to decode spatial metadata.

In an embodiment, the preceding method comprises: determining that the mono downmix backward compatibility indicator is in an OFF mode; and in response to the OFF mode: providing remaining portions of the bitstream to an MDP decoder to decode spatial metadata; then calculating a respective bit length for each EVS instance from a remaining portion of the bitstream based on the EVS bitrate distribution; reading EVS bits for each EVS instance based on a corresponding bit length; and providing the EVS bits to the EVS decoder as the first portion.

In an embodiment, a system comprises: one or more computer processors; and a non-transitory computer-readable medium storing instructions that, upon execution by the one or more processors, cause the one or more processors to perform operations of any one of the preceding method claims.

In an embodiment, a non-transitory computer-readable medium storing instructions that, upon execution by one or more computer processors, cause the one or more processors to perform operations of any one of the preceding method claims.

In accordance with example embodiments of the present disclosure, the processes described above may be implemented as computer software programs or on a computer-readable storage medium. For example, embodiments of the present disclosure include a computer program product including a computer program tangibly embodied on a machine readable medium, the computer program including program code for performing methods. In such embodiments, the computer program may be downloaded and mounted from the network via the communication unit 809, and/or installed from the removable medium 811, as shown in FIG. 8.

Generally, various example embodiments of the present disclosure may be implemented in hardware or special purpose circuits (e.g., control circuitry), software, logic or any combination thereof. For example, the units discussed above can be executed by control circuitry (e.g., a CPU in combination with other components of FIG. 8), thus, the control circuitry may be performing the actions described in this disclosure. Some aspects may be implemented in hardware, while other aspects may be implemented in firmware or software which may be executed by a controller, microprocessor or other computing device (e.g., control circuitry). While various aspects of the example embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, embodiments of the present disclosure include a computer program product including a computer program tangibly embodied on a machine readable medium, the computer program containing program codes configured to carry out the methods as described above.

In the context of the disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may be non-transitory and may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present disclosure may be written in any combination of one or more programming languages. These computer program codes may be provided to a processor of a general purpose computer, special purpose computer, or other programmable data processing apparatus that has control circuitry, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server or distributed over one or more remote computers and/or servers.

While this document contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method of decoding a bitstream of an audio signal, comprising:
   determining a frame length of the bitstream;
   computing a table row index of an immersive voice and audio services (IVAS) bitrate distribution control table based on the determined frame length;
   accessing the IVAS bitrate distribution control table at the table row index to identify a number of channels and a quantization strategy indicator to configure an IVAS decoder;
   with the IVAS decoder:
   extracting and decoding, using an immersive voice and audio services (IVAS) decoder, a coding mode indicator or coding tool indicator in a common header (CH) section of an IVAS bitstream, the coding mode indicator or coding tool indicator indicating a coding mode or coding tool for the audio signal;
   extracting and decoding, using the IVAS decoder, a mode header or tool header in a Tool Header (TH) section of the IVAS bitstream, the TH section including data associated with the IVAS bitrate distribution control table;
   extracting and decoding, using the IVAS decoder, a metadata payload from metadata payload (MDP) section of the IVAS bitstream, the metadata payload including spatial metadata;
   determining a quantization level from a set of quantization levels based on the quantization level indicator;
   unquantizing the spatial metadata according to the determined quantization level;
   extracting and decoding, using the IVAS decoder, a payload from a payload section of the IVAS bitstream, the payload including coded bits for each channel or downmix channel of the audio signal; and
   reconstructing or rendering the audio signal for playback on a device based on the coding mode or coding tool indicator, the mode header or tool header, the unquantized spatial metadata and the payload.

2. A system comprising:
   one or more processors; and
   a non-transitory computer-readable medium storing instructions that, upon execution by the one or more processors, cause the one or more processors to perform operations of the method of claim 1.

3. A non-transitory, computer-readable medium storing instructions that, upon execution by one or more processors, cause the one or more processors to perform operations of the method of claim 1.

* * * * *